(12) United States Patent
Ebeling et al.

(10) Patent No.: US 6,732,354 B2
(45) Date of Patent: May 4, 2004

(54) METHOD, SYSTEM AND SOFTWARE FOR PROGRAMMING RECONFIGURABLE HARDWARE

(75) Inventors: W. H. Carl Ebeling, Seattle, WA (US); Eugene B. Hogenauer, San Carlos, CA (US)

(73) Assignee: QuickSilver Technology, Inc., San Jose, CA (US)

(*) Notice: Subject to any disclaimer, the term of this patent is extended or adjusted under 35 U.S.C. 154(b) by 34 days.

(21) Appl. No.: 10/127,882

(22) Filed: Apr. 23, 2002

(65) Prior Publication Data

US 2003/0200538 A1 Oct. 23, 2003

(51) Int. Cl.[7] ................................................ G06F 9/45
(52) U.S. Cl. ...................... 717/119; 717/114; 717/149; 717/150
(58) Field of Search .................................. 717/119, 149, 717/150, 114–118; 712/18, 37, 201, 25; 716/16, 17

(56) References Cited

U.S. PATENT DOCUMENTS

| | | | |
|---|---|---|---|
| 5,021,947 A | * 6/1991 | Campbell et al. | 712/25 |
| 5,381,550 A | * 1/1995 | Jourdenais et al. | 717/149 |
| 5,465,368 A | * 11/1995 | Davidson et al. | 712/27 |
| 5,646,544 A | 7/1997 | Iadanza | 326/38 |
| 5,737,631 A | 4/1998 | Trimberger | 395/800.37 |
| 5,828,858 A | 10/1998 | Athanas et al. | 395/311 |
| 5,892,961 A | 4/1999 | Trimberger | 395/800.1 |
| 5,907,580 A | 5/1999 | Cummings | 375/220 |
| 5,933,642 A | * 8/1999 | Greenbaum et al. | 717/140 |
| 5,959,811 A | 9/1999 | Richardson | 365/182 |
| 5,966,534 A | 10/1999 | Cooke et al. | 395/705 |
| 5,970,254 A | 10/1999 | Cooke et al. | 395/800.37 |
| 5,999,734 A | * 12/1999 | Willis et al. | 717/149 |
| 6,016,395 A | * 1/2000 | Mohamed | 717/149 |
| 6,023,742 A | 2/2000 | Ebeling et al. | 710/107 |
| 6,078,736 A | * 6/2000 | Guccione | 716/16 |
| 6,094,065 A | 6/2000 | Tavana et al. | 326/39 |
| 6,088,043 A | 7/2000 | Kelleher et al. | 345/502 |
| 6,120,551 A | 9/2000 | Law et al. | 716/17 |
| 6,150,838 A | 11/2000 | Wittig et al. | 326/39 |
| 6,230,307 B1 | 5/2001 | Davis et al. | 716/16 |
| 6,237,029 B1 | 5/2001 | Master et al. | 709/217 |
| 6,507,947 B1 | * 1/2003 | Schreiber et al. | 717/160 |
| 2002/0042907 A1 | * 4/2002 | Yamanaka et al. | 717/149 |

OTHER PUBLICATIONS

Hammes, J. et al., "Cameron: high level language compilation for reconfigurable systems", Oct. 1999, Proc. of the Intntl. Conf. on Parallel Architectures and Compilation Techniques, pp. 236–244.*

(List continued on next page.)

*Primary Examiner*—Tuan Dam
*Assistant Examiner*—J. Derek Rutten
(74) *Attorney, Agent, or Firm*—Nancy R. Gamburd; Dykema Gossett PLLC

(57) ABSTRACT

The method, system and tangible medium storing computer readable software of the present invention, provide for program constructs, such as commands, declarations, variables, and statements, which have been developed to describe computations for an adaptive computing architecture, rather than provide instructions to a sequential microprocessor or DSP architecture. The invention includes program constructs that permit a programmer to define data flow graphs in software, to provide for operations to be executed in parallel, and to reference variable states and historical values in a straightforward manner. The preferred method, system, and software also includes mechanisms for efficiently referencing array variables, and enables the programmer to succinctly describe the direct data flow among matrices, nodes, and other configurations of computational elements and computational units forming the adaptive computing architecture. The preferred software includes dataflow statements, channel objects, stream variables, state variables, unroll statements, iterators, and loop statements.

47 Claims, 11 Drawing Sheets

OTHER PUBLICATIONS

Hartenstein, R., "Coarse grain reconfigurable architectures", Feb. 2001, Proceedings of the Asia and South Pacific Design Automation Conference (ASP–DAC 2001), pp. 564–569.*

Najjar, W.A., et al., "High–level language abstraction for reconfigurable computing", Aug. 2003, Computer, vol.: 36, Issue: 8, pp. 63–69.*

Mangione–Smith, W.H., et al., "Seeking solutions in configurable computing", Dec. 1997, Computer, vol.: 30, Issue: 12, pp. 38–43.*

John E. Dorband, "aCe C Language Reference Guide", Online (Archived Mar. 2001), <http://web.archive.org/web/20000616053819/http://newton.gsfc.nasa.gov/aCe/aCe_dir/aCe_cc_Ref.html>.*

Katherine Compton, Scott Hauck, "Reconfigurable computing: a survey of systems and software", Jun. 2002, ACM Press, ACM Computing Surveys (CSUR), vol. 34, Issue 2, pp: 171–210.*

Carl Ebeling, Darren C. Cronquist, Paul Franklin, "RaPiD Reconfigurable Pipelined Datapath", 1996, Springer–Verlag, 6th International Workshop on Field–Programmable Logic and Applications, pp. 126–135.*

E. Lee, and D. Messerschmitt, "Pipeline Interleaved Programmable DSP's: Synchronous Data Flow Programming", IEEE Transactions on Acoustics, Speech, and Signal Processing, Sep. 1987, vol. ASSP–35, No. 9., p. 1335, p. 1338.*

Cray T3E Fortran Optimization Guide, Cray Research Inc., Ver. 004–2518–002, Jan. 1999, Section 4.5.*

D. Bacon, S. Graham, and O. Sharp, "Compiler Transformations for High–Performance Computing", ACM Computing Surveys, Dec. 1994, vol. 26, No. 4, Section 6.3, pp. 368–373.*

Oracle8i JDBC Developer's Guide and Reference, Oracle Corporation, Release 3, 8.1.7, Jul. 2000, pp. 10–8–10–10.*

"OpenMP C and C++ Application Program Interface", OpenMP Architecture Review Board, Oct. 1998, pp. 8–16.*

FORTRAN 3.0.1 User's Guide, Sun Microsystems, Revision A, Aug. 1994, pp. 57–68.*

I. Horton, "Beginning Java 2: JDK 1.3 Edition", Wrox Press, Feb. 2001, Chapter 8, pp. 313–316.*

N. Halbwachs, P. Caspi, P. Raymond, and D. Pilaud, "The Synchronous Data Flow Programming Language LUSTRE", Proceedings of the IEEE, vol. 79, No. 9, Sep. 1991.*

J. Buck, S. Ha, E. Lee, D. Messerschmitt, "Ptolemy: A Framework for Simulating and Prototyping Heterogeneous Systems", International Journal of Computer Simulation, vol. 4, pp 155–182, Apr. 1994.*

E. Lee, and T. Parks, "Dataflow Process Networks", Proceedings of the IEEE, vol. 83, No. 5, May 1995.*

P. Whiting and R. Pascoe, "A History of Data–Flow Languages", IEEE Annals of the History of Computing, vol. 16, No. 4, 1994.*

E. Lee and D. Messerschmitt, "Synchronous Data Flow", Proceedings of the IEEE, vol. 75, No. 9, Sep. 1987.*

H. Jung, K. Lee, and S. Ha, "Efficient Hardware Controller Synthesis for Synchronous Dataflow Graph in System Level Design", Proceedings of the 13th International Symposium on System Synthesis (ISSS'00), Sep. 2000.*

M. Gokhale, and J. Schlesinger, "A Data Parallel C and its Platforms", Proceedings of the Fifth Symposium on the Frontiers of Massively Parallel Computation (Frontiers '95), Feb. 1995.*

M. Nichols, H. Siegel, and H. Dietz, "Data management and control–flow constructs in a SIMD/SPMD parallel language/compiler", Proceedings of the 3rd Symposium on the Frontiers of Massively Parallel Computation, Oct. 1990.*

J. McGraw, "Parallel Functional Programming in Sisal: Fictions, Facts, and Future", Lawrence Livermore National Laboratory, Jul. 1993.*

M. Williamson, and E. Lee, "Synthesis of parallel hardware implementations from synchronous dataflow graph specifications", Conference Record of the Thirtieth Asilomar Conference on Signals, Systems and Computers, Nov. 1996.*

E. Heinz, "An efficiently compilable extension of {M}odula–3 for problem–oriented explicitly parallel programming", Proceedings of the Joint Symposium on Parallel Processing, May 1993.*

B. Chapman and P. Mehrotra, "OpenMP and HPF: Integrating Two Paradigms", Proceedings of the 4th International Euro–Par Conference (Euro–Par'98), Springer–Verlag Heidelberg, Lecture Notes in Computer Science, vol. 1470, pp. 650–658, 1998.*

* cited by examiner

ADAPTIVE COMPUTING ENGINE (ACE)

FIG. 6A

*var* INDICATES A VARIABLE NAME;
*N* INDICATES A NUMBER, IS ARCHITECTURE DEPENDENT, AND IS 32 IN A PROTOTYPE DEVELOPMENT; AND
*type* INDICATES A VALID TYPE.

DATA DECLARATIONS:

```
// Declare an integer variable with N bits
integer<N> var;
unsigned integer<N> var;
// int16, int32

// Declare a fractional variable with N bits and F fractional bits
fract<N, F> var;
// fract16, fract32

// RAM variables:
// Variables declared as ram are allocated in RAM, not registers
// ram type var;

// State variables:
// Declare a state variable with N amount of history
state<type> stvar(N);
// Initialize a state variable explicitly with N amount of history
stvar.init(N);
// Initialize a state variable's value for time t-i
stvar[i] = value;
// Reference a state variable's value at time t-i
var = stvar[i];
// Advance time, and assign a new value to the state variable
stvar = value;
// Declare a state variable array of size Nsize with N history values
state<type> stvar[Nsize] (N) ;
// Reference the nth variable in the state array at time t-i
var = stvar[n][i] ;
// Debug method: print the current state variable history
stvar.display();
```

FIG. 6B

```
// Channels:
// Declare a channel for data of type with enough room for N items
channel<type> cvar(N);
// Declare a channel for N items, buffer B, and I intitial data items
channel<type> cvar(N,B,I);
// Channel methods:
cvar.size()          // Channel buffer size
cvar.items()         // Number of items currently in channel // Stream variables:
// Declare an input stream variable with a buffer of N items of type
// [N] is omitted if no buffer is allocated
streamIn<type> svar(N) ;
streamOut<type> svar(N) ;

// Stream use:
// Reference an input stream: returns current value, advances stream
var = svar.read();
// Write to output stream: sends next value, advances stream
svar.write(var);
// Open a stream data item for read/write without advancing stream
var = svar.open();
// Close an open stream data item: advances the stream
svar.close();
// Rewind a stream by N data items. N can be negative
svar.rewind(N);
// Debug method: print the stream buffer, showing current location
svar.display();

// Iterators:
// Declare an iterator to access an array X
iterator ivar(X, level0, init0, inc0, limit0,
              level1, init1, inc1, limit1, . . .);
// Re/Initialize an iterator
ivar.init(X, level0, init0, inc0, limit0,
          level1, init1, inc1, limit1, . . .);

// Initialize the interator to its initial parameters
ivar.reset();
// Iterator use:
// Reference an array via an iterator
var = ivar.next();
// Assign to an array via an iterator
ivar.next() = var;
```

FIG. 6C

CLASSES CAN BE USED TO DEFINE NEW DATA TYPES AS IN C++. THAT IS, *type* ABOVE CAN BE A PRIMITIVE OR A USER-DEFINED CLASS.

CONTROL:

```
    // Loop a fixed number of times (determined at runtime)
    // Loop definition arbitrary as long as repitition number
    // can be computed before loop begins
    // Loop index cannot be used in loop body
    loop (i=0; i< N ; i++) {
        statements;
    }

// Unroll a set of statement a fixed number of times
    // (determined at compile time)
    // Loop definition arbitrary as long as compiler can unroll
    // Loop index can be used in loop body
    unroll (i=0; i<N; i++) {
        statements;
    }

// Tell compiler to treat a block of statements as a dataflow
    graph
    dataflow {
        statements;
    }
```

FIG. 7

```
template <int nCoef>
class fir1 : public hardware {
public:
   int16 nOut;                    // Number of outputs requested per run()

// Streams are used to pass coefficients and data
   ram<fract16> coef[];           // Array of coefficients
   streamIn<fract16> input;       // Input array of samples
   streamOut<fract16> output;     // Output array for results state<fract16> sample(nCoeff); // Input values saved for last nCoef cycles // The init method for the fir class is used to initialize input
   // and output streams and load the coefficients
   void init (int16 newNout,
      streamIn<fract16> newCoef,
      streamIn<fract16> newInput,
      streamOut<fract16> newOutput)
   {
      nOut = newNout;             // Number of outputs that run() produces
      // Initialize streams from parameters
      coef = newCoef;
      input = newInput;
      output = newOutput;

// Initialize the input history in the sample state variable
      unroll (int i=0; i<nCoef-1; i++) dataflow {
         sample = input.read();
      }
   }

// The 'run' method takes the next block of input samples and outputs the
   // filtered results.
   void run (void)
   {
      fract16 sum;                // Accumulator for output values // On each pass, produce one output
      // This computation is one dataflow graph
      loop (int l=0; l<nOut; l++) dataflow {
         sample = input.read();          // Get next sample from input stream // Perform single convolution
         // sample[i] refers to the value of sample at time (t-i)
         sum = 0;
         unroll (int i=0; i<nCoef; i++) {
            sum = sum + coef[i] * sample[nCoef-i];
         }
         ouput.write(sum);       // Put result to output stream
      }
   }
```

FIG. 8

```
template <int nCoef>
class fir1 : public hardware {
public:
    int16 nOut;                    // Number of outputs requested per run()
    streamIn<fract16> coef;        // Stream of coefficients
    streamIn<fract16> input;       // Input stream of samples
    streamOut<fract16> output;     // Output stream for results fract16 coefReg[nCoef];        // Copy of coefficients in registers
    state<fract16> sample[nCoef];  //Input values saved for last nCoef cycles
    state<fract16> sample;         // Compiler complains, so we initialize below in init()

// The init method for the fir class is used to initialize input
    // and output streams and load the coefficients
    void init (int16 newNout,
        streamIn<fract16> newCoef,
        streamIn<fract16> newInput,
        streamOut<fract16> newOutput)
    {
        // Initialize state variable here since we can't above
        sample.init(nCoef);
        nOut = newNout;            // Number of outputs that run() produces // Intitialize streams from parameters
        coef = newCoef;
        input = newInput;
        output = newOutput;

// Copy the coefficients into the coefficient registers
        // These will be saved from one invocation of run to the next
        // Initialize the input history in the sample state variable
        // We do this in one loop so that stream reads can be done
        // in parallel
        unroll (int i=0; i<nCoef; i++) dataflow {
            coefReg[i] = coef.read();
            if (i<(nCoef-1)) sample = input.read();
        }
    }
    // The 'run' method takes the next block of input samples and outputs the
    // filtered results.
    void run (void)
    {
        fract16 sum;               // Accumulator for output values // On each pass, produce one output
        // This computation is one dataflow graph
        loop (int i=0; i<nOut; i++) dataflow {
            sample = input.read();           // Read the next sample from input stream // Perform single convolution
            // sample[i] refers to the value of sample at time (t-i)
            sum = 0.0;
            unroll (int i=0; i<nCoef; i++) {
                sum = sum + coefReg[i] * sample[nCoef-i];
            }
            output.write(sum);     // Write result to output stream
        }
    }
}
```

FIG. 9A

```
class fir2 : public hardware {
    int16 nOut;                    // Number of outputs requested int16 nPasses;                 // Number of passes required for nOut outputs
    int16 nCoef;                   // Size of coef array (runtime value)

fract16 *coef;                 // Array of coefficients
    Qiterator<fract16> coefI;

// Input stream: We read it as a simple stream, but we have
    // to rewind the stream between iterations because we read ahead
    streamIn<fract16> inputStr;

// Outputs are written in simple linear order
    streamOut<fract16> outputStr;  // Output stream for results public:
    // The init method for the fir class is used to initialize the
    // streams from the input parameters void init (int16 newNout,
        fract16 newCoef[], int16 newNcoef,
        streamIn<fract16> newInput,
        streamOut<fract16> newOutput)
    {
        // Establish new execution parameters
        nOut = newNout;
        nCoef = newNcoef;

// Initialize coefficient array
        coef = newCoef;
        // Use 1D linear access for accessing coefficients and input data
        coefI.init(coef, 0, 0, 1, nCoef);

// Initialize streams from stream parameters
        inputStr = newInput;
        outputStr = newOutput;

// NPROC outputs are computed each pass
        // determine the number of passes required to produce all outputs
        nPasses = nOut/NPROC;
    };
```

FIG. 9B

```
// The 'run' method takes the next block of input samples and outputs the
// filtered results.
void run (void)
{
   state<fract16> sample(NPROC);    // Input samples saved for NPROC cycles
   fract16 sum[NPROC];       // Accumulators for output values
   fract16 curCoef;  // Current coefficient value
   int i;                    // Compile-time variable // Intitialize the array starting indices
   // On each pass, produce NPROC outputs
   loop (int l=0; l<nPasses; l++) {
      coefI.reset();          // Reset iterator to initial state (not really needed)

// Intialize state with inputs, and intialize sum's
      unroll (i=0; i<NPROC; i++) dataflow {
         sum[i] = 0.0;
         if (i<(NPROC-1)) sample = inputStr.read();
      }
      loop (int l=0; l<nCoef; l++) dataflow {
         curCoef = coefI.next();      // Get next coefficient
         sample = inputStr.read();    // Get next input sample
                                      // (current input is sample[1])
         // multiply by the samples by the coefficient
         // sum[0] corresponds to oldest sample
         unroll (i=0; i<NPROC; i++) {
            sum[i] = sum[i] + curCoef * sample[NPROC-i];
         }
      }
      // We have to back up the input stream because we need to re-read some
      // of the data we just read
      // We had to read ahead by the number of coefficients - 1
      inputStr.rewind(nCoef - 1);

// Write filtered data back to RAM
      // We could overlap the initialization for the next set of
      // of output values with this writeback
      unroll (i=0; i<NPROC; i++) dataflow {
         outputStr.write(sum[i]);
      }
   }
}
```

METHOD, SYSTEM AND SOFTWARE FOR PROGRAMMING RECONFIGURABLE HARDWARE

CROSS-REFERENCE TO RELATED APPLICATIONS

This application is related to Paul L. Master et al., U.S. patent application Ser. No. 09/815,122, entitled "Adaptive Integrated Circuitry With Heterogeneous And Reconfigurable Matrices Of Diverse And Adaptive Computational Units Having Fixed, Application Specific Computational Elements", filed Mar. 22, 2001, commonly assigned to QuickSilver Technology, Inc., and incorporated by reference herein, with priority claimed for all commonly disclosed subject matter (the "first related application").

This application is related to Paul L. Master et al., U.S. patent application Ser. No. 09/997,530, entitled "Apparatus, System and Method For Configuration Of Adaptive Integrated Circuitry Having Fixed, Application Specific Computational Elements", filed Nov. 30, 2001, commonly assigned to QuickSilver Technology, Inc., and incorporated by reference herein, with priority claimed for all commonly disclosed subject matter (the "second related application").

FIELD OF THE INVENTION

The present invention relates, in general, to software and code languages used in programming hardware circuits, and more specifically, to a method, system, and language command or statement structure for defining adaptive computational units in reconfigurable integrated circuitry.

BACKGROUND OF THE INVENTION

The first related application discloses a new form or type of integrated circuitry which effectively and efficiently combines and maximizes the various advantages of processors, application specific integrated circuits ("ASICs"), and field programmable gate arrays ("FPGAs"), while minimizing potential disadvantages. The first related application illustrates a new form or type of integrated circuit ("IC"), referred to as an adaptive computing engine ("ACE"), which provides the programming flexibility of a processor, the post-fabrication flexibility of FPGAs, and the high speed and high utilization factors of an ASIC. This ACE integrated circuitry is readily reconfigurable, is capable of having corresponding, multiple modes of operation, and further minimizes power consumption while increasing performance, with particular suitability for low power applications, such as for use in hand-held and other battery-powered devices.

Configuration information (or, equivalently, adaptation information) is required to generate, in advance or in real-time (or potentially at a slower rate), the adaptations (configurations and reconfigurations) which provide and create one or more operating modes for the ACE circuit, such as wireless communication, radio reception, personal digital assistance ("PDA"), MP3 music playing, or any other desired functions.

The second related application discloses a preferred system embodiment that includes an ACE integrated circuit coupled with one or more sets of configuration information. This configuration (adaptation) information is required to generate, in advance or in real-time (or potentially at a slower rate), the configurations and reconfigurations which provide and create one or more operating modes for the ACE circuit, such as wireless communication, radio reception, personal digital assistance ("PDA"), MP3 or MP4 music playing, or any other desired functions. Various methods, apparatuses and systems are also illustrated in the second related application for generating and providing configuration information for an ACE integrated circuit, for determining ACE reconfiguration capacity or capability, for providing secure and authorized configurations, and for providing appropriate monitoring of configuration and content usage.

As disclosed in the first and second related applications, the adaptive computing engine ("ACE") circuit of the present invention, for adaptive or reconfigurable computing, includes a plurality of differing, heterogeneous computational elements coupled to an interconnection network (rather than the same, homogeneous repeating and arrayed units of FPGAs). The plurality of heterogeneous computational elements include corresponding computational elements having fixed and differing architectures, such as fixed architectures for different functions such as memory, addition, multiplication, complex multiplication, subtraction, synchronization, queuing, sampling, configuration, reconfiguration, control, input, output, routing, and field programmability. In response to configuration information, the interconnection network is operative, in advance, in real-time or potentially slower, to configure and reconfigure the plurality of heterogeneous computational elements for a plurality of different functional modes, including linear algorithmic operations, non-linear algorithmic operations, finite state machine operations, memory operations, and bit-level manipulations. In turn, this configuration and reconfiguration of heterogeneous computational elements, forming various computational units and adaptive matrices, generates the selected, higher-level operating mode of the ACE integrated circuit, for the performance of a wide variety of tasks.

This adaptability or reconfigurability (with adaptation and configuration used interchangeably and equivalently herein) of the ACE circuitry is based upon, among other things, determining the optimal type, number, and sequence of computational elements required to perform a given task. As indicated above, such adaptation or configuration, as used herein, refers to changing or modifying ACE functionality, from one functional mode to another, in general, for performing a task within a specific operating mode, or for changing operating modes.

The algorithm of the task, preferably, is expressed through "data flow graphs" ("DFGs"), which schematically depict inputs, outputs and the computational elements needed for a given operation. Software engineers frequently use data flow graphs to guide the programming of the algorithms, particularly for digital signal processing ("DSP") applications. Such DFGs typically have one of two forms, either of which are applicable to the present invention: (1) representing the flow of data through a system where data streams from one module (e.g., a filter) to another module; and (2) representing a computation as a combinational flow of data through a set of operators from inputs to outputs.

A dilemma arises when developing programs for adaptive or reconfigurable computing applications, as currently there are not any adequate or sufficient methodologies or programming languages expressly designed for such adaptive computing, other than the present invention. High-level programming languages, such as C++ or Java, are widely used, well known, and easily maintainable. The languages were developed to accommodate a variety of applications, many of which are platform-independent, but all of which are fundamentally based upon compiling a sequence of instructions ultimately fed into processor, microprocessor, or DSP. The program code is designed to run sequentially, generally in response to a user-initiated event. However the languages have limited capabilities of expressing the concurrency of computing operations, and other features, which may be significant in adaptive computing applications.

Assembly languages, at the other extreme, tightly control data flow through hardware elements such as the logic gates, registers and random access memory (RAM) of a specific processor, and efficiently direct resource usage. By their very nature, however, assembly languages are extremely verbose and detailed, requiring the programmer to specify exactly when and where every operation is to be performed. Consequently, programming in an assembly language is extraordinarily labor-intensive, expensive, and difficult to learn. In addition, as languages designed specifically for programming a processor (i.e., fixed processor architecture), assembly languages have limited, if any, applicability to or utility for adaptive computing applications.

In between these extremes, and also very different than a high-level language, are hardware description languages (HDLs), that allow a designer to specify the behavior of a hardware system as a collection of components described at the structural or behavioral level. These languages may allow explicit parallelism, but require the designer to manage such parallelism in great detail. In addition, like assembly languages, HDLs require the programmer to specify exactly when and where every operation is to be performed.

As a consequence, a need remains for a method and system of providing programmability of adaptive computing architectures. A need also remains for a comparatively high-level language that is syntactically similar to widely used and well known languages like C++, for ready acceptance within the engineering and computing fields, but that also contains specialized constructs for an adaptive computing environment and for maximizing the performance of an ACE integrated circuit or other adaptive computing architecture.

SUMMARY OF THE INVENTION

The present invention is a system, tangible medium storing computer readable software, and methodology that facilitate programming of integrated circuits having adaptive and reconfigurable computing architectures. The method, system and tangible medium storing computer readable software of the present invention provide for program constructs, such as commands, declarations, variables, and statements, which have been developed to describe computations for an adaptive computing architecture, rather than provide instructions to a sequential microprocessor or DSP architecture. The invention includes program constructs that permit a programmer to define data flow graphs in software, to provide for operations to be executed in parallel, and to reference variable states and historical values in a straightforward manner. The preferred method, system, and tangible medium storing computer readable software also includes mechanisms for efficiently referencing array variables, and enables the programmer to succinctly describe the direct data flow among matrices, nodes, and other configurations of computational elements and computational units forming the adaptive computing architecture. The preferred tangible medium storing computer readable software includes software having dataflow statements, channel objects, stream variables, state variables, unroll statements, iterators, and loop statements.

Numerous other advantages and features of the present invention will become readily apparent from the following detailed description of the invention and the embodiments thereof, from the claims and from the accompanying drawings.

BRIEF DESCRIPTION OF THE DRAWINGS

FIGS. 6A, 6B and 6C are diagrams providing a useful summary of the Q programming language of the present invention.

FIG. 7 provides a FIR filter, expressed in the Q language for implementation in adaptive computing architecture, in accordance with the present invention.

FIG. 8 provides a FIR filter with registered coefficients, expressed in the Q language for implementation in adaptive computing architecture, in accordance with the present invention.

FIGS. 9A and 9B provide a FIR filter for a comparatively large number of coefficients, expressed in the Q language for implementation in adaptive computing architecture, in accordance with the present invention.

DETAILED DESCRIPTION OF THE INVENTION

Figure 1:
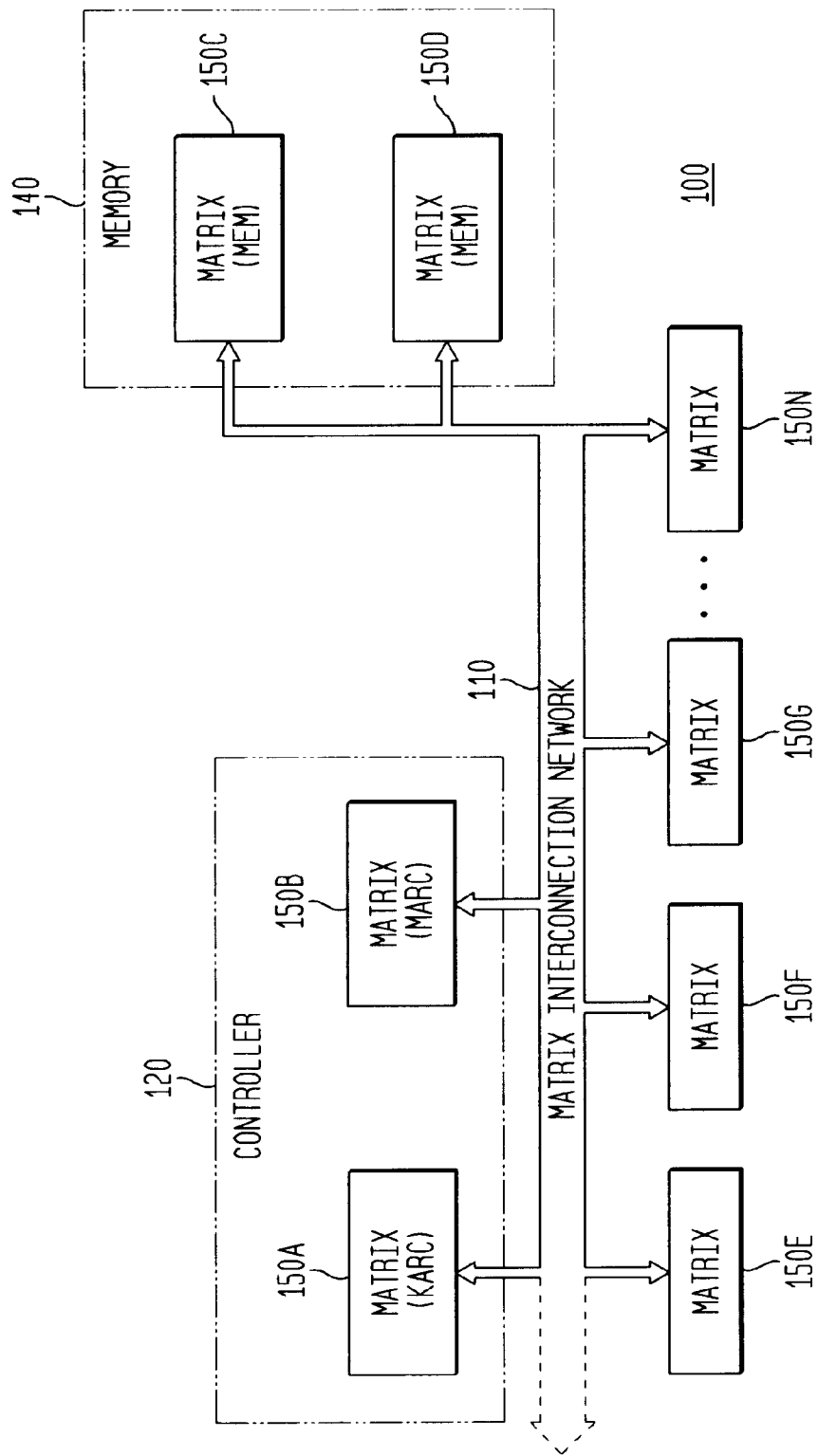
FIG. 1 is a block diagram illustrating a preferred apparatus embodiment in accordance the invention disclosed in the first related application.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments or generalized examples illustrated.

As mentioned above, a need remains for a method and system of providing programmability of adaptive computing architectures. Such a method and system are provided, in accordance with the present invention, for enabling ready programmability of adaptive computing architectures, such as the ACE architecture. The present invention also provides for a comparatively high-level language, referred to as the Q programming language (or Q language), that is designed to be backward compatible with and syntactically similar to widely used and well known languages like C++, for acceptance within the engineering and computing fields. More importantly, the method, system, and Q language of the present invention provides new and specialized program constructs for an adaptive computing environment and for maximizing the performance of an ACE integrated circuit or other adaptive computing architecture.

The Q language methodology of the present invention, including commands, declarations, variables, and statements (which are individually and collectively referred to herein as "constructs", "program constructs" or "program structures") have been developed to describe computations for an adaptive computing architecture, and preferably the ACE architecture. It includes program constructs that permit a programmer to define data flow graphs in software, to provide for operations to be executed in parallel, and to reference variable states in a straightforward manner. The Q language also includes mechanisms for efficiently referencing array variables, and enables the programmer to succinctly describe the direct data flow among matrices, nodes, and other configurations of computational elements and computational units. Each of these new features of the Q language provide for effective programming in a reconfigurable computing environment, facilitating a compiler to implement the programmed algorithms efficiently in adaptive hardware. While the Q language was developed as part of a design system for the ACE architecture, its feature set is not limited to that application, and has broad applicability for adaptive computing and other potential adaptive or reconfigurable architectures.

As discussed in greater detail below, with reference to FIGS. 3 through 9, the program constructs of the language, method and system of the present invention include: (1) "dataflow" statements, which declare that the operations within the dataflow statement may be executed in parallel; (2) "channel" objects, which are objects with a buffer for data items, having an input stream and an output stream, and which connect together computational "blocks"; (3) "stream" variables, used to reference channel buffers, using an index which is automatically incremented whenever it is read or written, providing automatic array indexing; (4) "state" variables, which are register variables which provide convenient access to previous values of the variable; (5) "unroll" statements, which provide a mechanism for a loop-type statement to have a determinate number of iterations when compiled, for execution in the minimum number of cycles allowed by any data dependencies; (6) "iterators", which are special indexing variables which provide for automatic accessing of arrays in a predetermined address pattern; and (7) "loop" statements, which provide for loop or repeating calculations which execute a fixed number of times.

These program constructs of the present invention have particular relevance for programming of the preferred adaptive computing architecture. When the program constructs are compiled and converted into configuration information and executed in the ACE, various computational units of the ACE architecture are configured or "called" into existence, executing the program across both space and time, such as for parallel execution of a dataflow statement. As a consequence, the ACE architecture is explained in detail below with reference to FIGS. 1 and 2, followed by the description of the method, system and language of the present invention.

Figure 2:
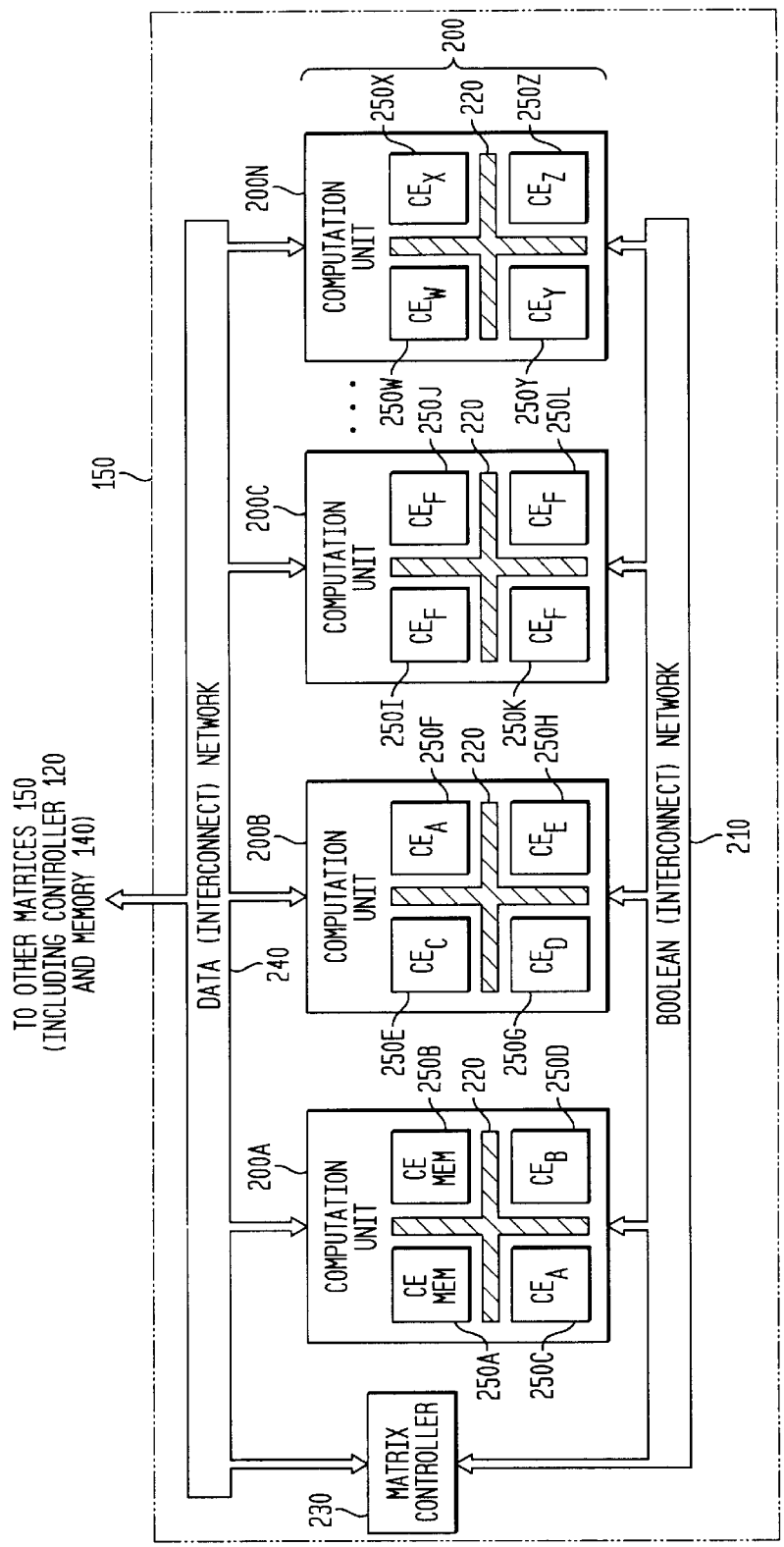
FIG. 2 is a block diagram illustrating a reconfigurable matrix, a plurality of computation units, and a plurality of computational elements of the ACE architecture, in accordance the invention disclosed in the first related application.

FIG. 1 is a block diagram illustrating a preferred apparatus 100 embodiment of the adaptive computing engine (ACE) architecture, in accordance the invention disclosed in the first related application. The ACE 100 is preferably embodied as an integrated circuit, or as a portion of an integrated circuit having other, additional components. In the preferred embodiment, the ACE 100 includes one or more reconfigurable matrices (or nodes) 150, such as matrices 150A through 150N as illustrated, and a matrix interconnection network (MIN) 110. Also in the preferred embodiment, one or more of the matrices 150, such as matrices 150A and 150B, are configured for functionality as a controller 120, while other matrices, such as matrices 150C and 150D, are configured for functionality as a memory 140. While illustrated as separate matrices 150A through 150D, it should be noted that these control and memory functionalities may be, and preferably are, distributed across a plurality of matrices 150 having additional functions to, for example, avoid any processing or memory "bottlenecks" or other limitations. Such distributed functionality, for example, is illustrated in FIG. 2. The various matrices 150 and matrix interconnection network 110 may also be implemented together as fractal subunits, which may be scaled from a few nodes to thousands of nodes.

A significant departure from the prior art, the ACE 100 does not utilize traditional (and typically separate) data, DMA, random access, configuration and instruction busses for signaling and other transmission between and among the reconfigurable matrices 150, the controller 120, and the memory 140, or for other input/output ("I/O") functionality. Rather, data, control and configuration information are transmitted between and among these matrix 150 elements, utilizing the matrix interconnection network 110, which may be configured and reconfigured, to provide any given connection between and among the reconfigurable matrices 150, including those matrices 150 configured as the controller 120 and the memory 140, as discussed in greater detail below.

It should also be noted that once configured, the MIN 110 also functions as a memory, directly providing the interconnections for particular functions, until and unless it is reconfigured. In addition, such configuration and reconfiguration may occur in advance of the use of a particular function or operation, and/or may occur in real-time or at a slower rate, namely, in advance of, during or concurrently with the use of the particular function or operation. Such configuration and reconfiguration, moreover, may be occurring in a distributed fashion without disruption of function or operation, with computational elements in one location being configured while other computational elements (having been previously configured) are concurrently performing their designated function. This configuration flexibility of the ACE 100 contrasts starkly with FPGA reconfiguration, both which generally occurs comparatively slowly, not in real-time or concurrently with use, and which must be completed in its entirety prior to any operation or other use.

The matrices 150 configured to function as memory 140 may be implemented in any desired or preferred way, utilizing computational elements (discussed below) or fixed memory elements, and may be included within the ACE 100 or incorporated within another IC or portion of an IC. In the preferred embodiment, the memory 140 is included within the ACE 100, and preferably is comprised of computational elements which are low power consumption random access memory (RAM), but also may be comprised of computational elements of any other form of memory, such as flash, DRAM, SRAM, MRAM, ROM, EPROM or $E^2$PROM. In the preferred embodiment, the memory 140 preferably includes direct memory access (DMA) engines, not separately illustrated.

The controller 120 is preferably implemented, using matrices 150A and 150B configured as adaptive finite state machines, as a reduced instruction set ("RISC") processor, controller or other device or IC capable of performing the two types of functionality discussed below. (Alternatively, these functions may be implemented utilizing a conventional RISC or other processor.) This control functionality may also be distributed throughout one or more matrices 150 which perform other, additional functions as well. In addition, this control functionality may be included within and directly embodied as configuration information, without separate hardware controller functionality. The first control functionality, referred to as "kernel" control, is illustrated as kernel controller ("KARC") of matrix 150A, and the second control functionality, referred to as "matrix" control, is illustrated as matrix controller ("MARC") of matrix 150B. The kernel and matrix control functions of the controller 120 are explained in greater detail below, with reference to the configurability and reconfigurability of the various matrices 150, and with reference to the preferred form of combined data, configuration and control information referred to herein as a "silverware" module.

The matrix interconnection network 110 of FIG. 1, and its subset interconnection networks illustrated in FIG. 2 (Boolean interconnection network 210, data interconnection network 240, and interconnect 220), collectively and generally referred to herein as "interconnect", "interconnection(s)" or "interconnection network(s)", may be implemented generally as known in the art, such as utilizing FPGA interconnection networks or switching fabrics, albeit in a considerably more varied fashion. In the preferred embodiment, the various interconnection networks are implemented as described, for example, in U.S. Pat. No. 5,218,240, U.S. Pat. No. 5,336,950, U.S. Pat. No. 5,245,227, and U.S. Pat. No. 5,144,166. These various interconnection networks provide selectable (or switchable) connections between and among the controller 120, the memory 140, the various matrices 150, and the computational units 200 and computational elements 250, providing the physical basis for the configuration and reconfiguration referred to herein, in response to and under the control of configuration signaling generally referred to herein as "configuration information". In addition, the various interconnection networks (110, 210, 240 and 220) provide selectable or switchable data, input, output, control and configuration paths, between and among the controller 120, the memory 140, the various matrices 150, and the computational units 200 and computational elements 250, in lieu of any form of traditional or separate input/output busses, data busses, DMA, RAM, configuration and instruction busses.

It should be pointed out, however, that while any given switching or selecting operation of or within the various interconnection networks (110, 210, 240 and 220) may be implemented as known in the art, the design and layout of the various interconnection networks (110, 210, 240 and 220), in accordance with the ACE architecture are new and novel. For example, varying levels of interconnection are provided to correspond to the varying levels of the matrices 150, the computational units 200, and the computational elements 250. At the matrix 150 level, in comparison with the prior art FPGA interconnect, the matrix interconnection network 110 is considerably more limited and less "rich", with lesser connection capability in a given area, to reduce capacitance and increase speed of operation. Within a particular matrix 150 or computational unit 200, however, the interconnection network (210, 220 and 240) may be considerably more dense and rich, to provide greater adaptation and reconfiguration capability within a narrow or close locality of reference.

The various matrices or nodes 150 are reconfigurable and heterogeneous, namely, in general, and depending upon the desired configuration: reconfigurable matrix 150A is generally different from reconfigurable matrices 150B through 150N; reconfigurable matrix 150B is generally different from reconfigurable matrices 150A and 150C through 150N; reconfigurable matrix 150C is generally different from reconfigurable matrices 150A, 150B and 150D through 150N, and so on. The various reconfigurable matrices 150 each generally contain a different or varied mix of adaptive and reconfigurable computational (or computation) units (200); the computational units 200, in turn, generally contain a different or varied mix of fixed, application specific computational elements (250), which may be adaptively connected, configured and reconfigured in various ways to perform varied functions, through the various interconnection networks. In addition to varied internal configurations and reconfigurations, the various matrices 150 may be connected, configured and reconfigured at a higher level, with respect to each of the other matrices 150, through the matrix interconnection network 110, also as discussed in greater detail in the first related application.

Several different, insightful and novel concepts are incorporated within the ACE 100 architecture, provide a useful explanatory basis for the real-time operation of the ACE 100 and its inherent advantages, and provide a useful foundation for understanding the present invention.

The first novel concepts of ACE 100 architecture concern the adaptive and reconfigurable use of application specific, dedicated or fixed hardware units (computational elements 250), and the selection of particular functions for acceleration, to be included within these application specific, dedicated or fixed hardware units (computational elements 250) within the computational units 200 (FIG. 4) of the matrices 150, such as pluralities of multipliers, complex multipliers, and adders, each of which are designed for optimal execution of corresponding multiplication, complex multiplication, and addition functions. Through the varying levels of interconnect, corresponding algorithms are then implemented, at any given time, through the configuration and reconfiguration of fixed computational elements (250), namely, implemented within hardware which has been optimized and configured for efficiency, i.e., a "machine" is configured in real-time which is optimized to perform the particular algorithm.

The next and perhaps most significant concept of the present invention, is the concept of reconfigurable "heterogeneity" utilized to implement the various selected algorithms mentioned above. In accordance with the present invention, within computation units 200, different computational elements (250) are implemented directly as correspondingly different fixed (or dedicated) application specific hardware, such as dedicated multipliers, complex multipliers, and adders. Utilizing interconnect (210 and 220), these differing, heterogeneous computational elements (250) may then be adaptively configured, in advance, in real-time or at a slower rate, to perform the selected algorithm, such as the performance of discrete cosine transformations often utilized in mobile communications. As a consequence, in accordance with the present invention, different ("heterogeneous") computational elements (250) are configured and reconfigured, at any given time, through various levels of interconnect, to optimally perform a given algorithm or other function. In addition, for repetitive functions, a given instantiation or configuration of computational elements may also remain in place over time, i.e., unchanged, throughout the course of such repetitive calculations.

The temporal nature of the ACE 100 architecture should also be noted. At any given instant of time, utilizing different levels of interconnect (110, 210, 240 and 220), a particular configuration may exist within the ACE 100 which has been optimized to perform a given function or implement a particular algorithm, such as to implement channel acquisition and control processing in a GSM operating mode in a mobile station. At another instant in time, the configuration may be changed, to interconnect other computational elements (250) or connect the same computational elements 250 differently, for the performance of another function or algorithm, such as for data and voice reception for a GSM operating mode. Two important features arise from this temporal reconfigurability. First, as algorithms may change over time to, for example, implement a new technology standard, the ACE 100 may co-evolve and be reconfigured to implement the new algorithm. Second, because computational elements are interconnected at one instant in time, as an instantiation of a given algorithm, and then reconfigured at another instant in time for performance of another, different algorithm, gate (or transistor) utilization is maximized, providing significantly better performance than the most efficient ASICs relative to their activity factors. This temporal reconfigurability also illustrates the memory functionality inherent in the MIN 110, as mentioned above.

This temporal reconfigurability of computational elements 250, for the performance of various different algorithms, also illustrates a conceptual distinction utilized herein between configuration and reconfiguration, on the one hand, and programming or reprogrammability, on the other hand. Typical programmability utilizes a pre-existing group or set of functions, which may be called in various orders, over time, to implement a particular algorithm. In contrast, configurability and reconfigurability, as used herein, includes the additional capability of adding or creating new functions which were previously unavailable or non-existent.

Next, the present invention also utilizes a tight coupling (or interdigitation) of data and configuration (or other control) information, within one, effectively continuous stream of information. This coupling or commingling of data and configuration information, referred to as "silverware" or as a "silverware" module, is the subject of another related patent application. For purposes of the present invention, however, it is sufficient to note that this coupling of data and configuration information into one information (or bit) stream, which may be continuous or divided into packets, helps to enable real-time reconfigurability of the ACE 100, without a need for the (often unused) multiple, overlaying networks of hardware interconnections of the prior art. For example, as an analogy, a particular, first configuration of computational elements at a particular, first period of time, as the hardware to execute a corresponding algorithm during or after that first period of time, may be viewed or conceptualized as a hardware analog of "calling" a subroutine in software which may perform the same algorithm. As a consequence, once the configuration of the computational elements has occurred (i.e., is in place), as directed by (a first subset of) the configuration information, the data for use in the algorithm is immediately available as part of the silverware module. The same computational elements may then be reconfigured for a second period of time, as directed by second configuration information (i.e., a second subset of configuration information), for execution of a second, different algorithm, also utilizing immediately available data. The immediacy of the data, for use in the configured computational elements, provides a one or two clock cycle hardware analog to the multiple and separate software steps of determining a memory address and fetching stored data from the addressed registers. This has the further result of additional efficiency, as the configured computational elements may execute, in comparatively few clock cycles, an algorithm which may require orders of magnitude more clock cycles for execution if called as a subroutine in a conventional microprocessor or digital signal processor ("DSP").

This use of silverware modules, as a commingling of data and configuration information, in conjunction with the reconfigurability of a plurality of heterogeneous and fixed computational elements 250 to form adaptive, different and heterogeneous computation units 200 and matrices 150, enables the ACE 100 architecture to have multiple and different modes of operation. For example, when included within a hand-held device, given a corresponding silverware module, the ACE 100 may have various and different operating modes as a cellular or other mobile telephone, a music player, a pager, a personal digital assistant, and other new or existing functionalities. In addition, these operating modes may change based upon the physical location of the device. For example, in accordance with the present invention, while configured for a first operating mode, using a first set of configuration information, as a CDMA mobile telephone for use in the United States, the ACE 100 may be reconfigured using a second set of configuration information for an operating mode as a GSM mobile telephone for use in Europe.

Referring again to FIG. 1, the functions of the controller 120 (preferably matrix (KARC) 150A and matrix (MARC) 150B, configured as finite state machines) may be explained with reference to a silverware module, namely, the tight coupling of data and configuration information within a single stream of information, with reference to multiple potential modes of operation, with reference to the reconfigurable matrices 150, and with reference to the reconfigurable computation units 200 and the computational elements 150 illustrated in FIG. 3. As indicated above, through a silverware module, the ACE 100 may be configured or reconfigured to perform a new or additional function, such as an upgrade to a new technology standard or the addition of an entirely new function, such as the addition of a music function to a mobile communication device. Such a silverware module may be stored in the matrices 150 of memory 140, or may be input from an external (wired or wireless) source through, for example, matrix interconnection network 110. In the preferred embodiment, one of the plurality of matrices 150 is configured to decrypt such a module and verify its validity, for security purposes. Next, prior to any configuration or reconfiguration of existing ACE 100 resources, the controller 120, through the matrix (KARC) 150A, checks and verifies that the configuration or reconfiguration may occur without adversely affecting any pre-existing functionality, such as whether the addition of music functionality would adversely affect pre-existing mobile communications functionality. In the preferred embodiment, the system requirements for such configuration or reconfiguration are included within the silverware module, for use by the matrix (KARC) 150A in performing this evaluative function. If the configuration or reconfiguration may occur without such adverse affects, the silverware module is allowed to load into the matrices 150 of memory 140, with the matrix (KARC) 150A setting up the DMA engines within the matrices 150C and 150D of the memory 140 (or other stand-alone DMA engines of a conventional memory). If the configuration or reconfiguration would or may have such adverse affects, the matrix (KARC) 150A does not allow the new module to be incorporated within the ACE 100.

Continuing to refer to FIG. 1, the matrix (MARC) 150B manages the scheduling of matrix 150 resources and the timing of any corresponding data, to synchronize any configuration or reconfiguration of the various computational elements 250 and computation units 200 with any corresponding input data and output data. In the preferred embodiment, timing information is also included within a silverware module, to allow the matrix (MARC) 150B through the various interconnection networks to direct a reconfiguration of the various matrices 150 in time, and preferably just in time, for the reconfiguration to occur before corresponding data has appeared at any inputs of the various reconfigured computation units 200. In addition, the matrix (MARC) 150B may also perform any residual processing which has not been accelerated within any of the various matrices 150. As a consequence, the matrix (MARC) 150B may be viewed as a control unit which "calls" the configurations and reconfigurations of the matrices 150, computation units 200 and computational elements 250, in real-time, in synchronization with any corresponding data to be utilized by these various reconfigurable hardware units, and which performs any residual or other control processing. Other matrices 150 may also include this control functionality, with any given matrix 150 capable of calling and controlling a configuration and reconfiguration of other matrices 150.

FIG. 2 is a block diagram illustrating, in greater detail, a reconfigurable matrix 150 with a plurality of computation units 200 (illustrated as computation units 200A through 200N), and a plurality of computational elements 250 (illustrated as computational elements 250A through 250Z), and provides additional illustration of the preferred types of computational elements 250. As illustrated in FIG. 2, any matrix 150 generally includes a matrix controller 230, a plurality of computation (or computational) units 200, and as logical or conceptual subsets or portions of the matrix interconnect network 110, a data interconnect network 240 and a Boolean interconnect network 210. As mentioned above, in the preferred embodiment, at increasing "depths" within the ACE 100 architecture, the interconnect networks become increasingly rich, for greater levels of adaptability and reconfiguration. The Boolean interconnect network 210, also as mentioned above, provides the reconfiguration and data interconnection capability between and among the various computation units 200, and is preferably small (i.e., only a few bits wide), while the data interconnect network 240 provides the reconfiguration and data interconnection capability for data input and output between and among the various computation units 200, and is preferably comparatively large (i.e., many bits wide). It should be noted, however, that while conceptually divided into reconfiguration and data capabilities, any given physical portion of the matrix interconnection network 110, at any given time, may be operating as either the Boolean interconnect network 210, the data interconnect network 240, the lowest level interconnect 220 (between and among the various computational elements 250), or other input, output, configuration, or connection functionality.

Continuing to refer to FIG. 2, included within a computation unit 200 are a plurality of computational elements 250, illustrated as computational elements 250A through 250Z (individually and collectively referred to as computational elements 250), and additional interconnect 220. The interconnect 220 provides the reconfigurable interconnection capability and input/output paths between and among the various computational elements 250. As indicated above, each of the various computational elements 250 consist of dedicated, application specific hardware designed to perform a given task or range of tasks, resulting in a plurality of different, fixed computational elements 250. Utilizing the interconnect 220, the fixed computational elements 250 may be reconfigurably connected together into adaptive and varied computational units 200, which also may be further reconfigured and interconnected, to execute an algorithm or other function, at any given time, utilizing the interconnect 220, the Boolean network 210, and the matrix interconnection network 110. While illustrated with effectively two levels of interconnect (for configuring computational elements 250 into computational units 200, and in turn, into matrices 150), for ease of explanation, it should be understood that the interconnect, and corresponding configuration, may extend to many additional levels within the ACE 100. For example, utilizing a tree concept, with the fixed computational elements analogous to leaves, a plurality of levels of interconnection and adaptation are available, analogous to twigs, branches, boughs, limbs, trunks, and so on, without limitation.

In the preferred ACE 100 embodiment, the various computational elements 250 are designed and grouped together, into the various adaptive and reconfigurable computation units 200. In addition to computational elements 250 which are designed to execute a particular algorithm or function, such as multiplication, correlation, clocking, synchronization, queuing, sampling, or addition, other types of computational elements 250 are also utilized in the preferred embodiment. As illustrated in FIG. 2, computational elements 250A and 250B implement memory, to provide local memory elements for any given calculation or processing function (compared to the more "remote" memory 140). In addition, computational elements 250I, 250J, 250K and 250L are configured to implement finite state machines, to provide local processing capability (compared to the more "remote" matrix (MARC) 150B), especially suitable for complicated control processing.

With the various types of different computational elements 250 which may be available, depending upon the desired functionality of the ACE 100, the computation units 200 may be loosely categorized. A first category of computation units 200 includes computational elements 250 performing linear operations, such as multiplication, addition, finite impulse response filtering, clocking, synchronization, and so on. A second category of computation units 200 includes computational elements 250 performing non-linear operations, such as discrete cosine transformation, trigonometric calculations, and complex multiplications. A third type of computation unit 200 implements a finite state machine, such as computation unit 200C as illustrated in FIG. 2, particularly useful for complicated control sequences, dynamic scheduling, and input/output management, while a fourth type may implement memory and memory management, such as computation unit 200A as illustrated in FIG. 2. Lastly, a fifth type of computation unit 200 may be included to perform bit-level manipulation, such as for encryption, decryption, channel coding, Viterbi decoding, and packet and protocol processing (such as Internet Protocol processing). In addition, another (sixth) type of computation unit 200 may be utilized to extend or continue any of these concepts, such as bit-level manipulation or finite state machine manipulations, to increasingly lower levels within the ACE 100 architecture.

In the preferred embodiment, in addition to control from other matrices or nodes 150, a matrix controller 230 may also be included or distributed within any given matrix 150, also to provide greater locality of reference and control of any reconfiguration processes and any corresponding data manipulations. For example, once a reconfiguration of computational elements 250 has occurred within any given computation unit 200, the matrix controller 230 may direct that that particular instantiation (or configuration) remain intact for a certain period of time to, for example, continue repetitive data processing for a given application.

With this foundation of the preferred adaptive computing architecture (ACE), the need for the present invention is readily apparent, as there are no adequate or sufficient high-level programming languages which are available to fully exploit such adaptive hardware. The Q language of the present invention, for example, provides program constructs in a high-level language that allow detailed description of concurrent computation, without requiring the complexity of a hardware description language. One of the goals of the Q language is to incorporate language features which allow a compiler to make efficient use of the adaptive hardware to create concurrent computations at the operator level and the task level. FIG. 3 illustrates the role of the Q language in the context of the ACE architecture, and beginning with the exemplary data flow graph of FIG. 4, the new and novel features of the present invention are discussed in detail.

It should be noted that in the following discussion, and with regard to the present invention in general, the important features are the mechanisms and the semantics of the mechanisms, such as for the dataflow statements, channels, stream variables, state variables, unroll statements, and iterators, rather than the particular syntax involved.

Figure 3:
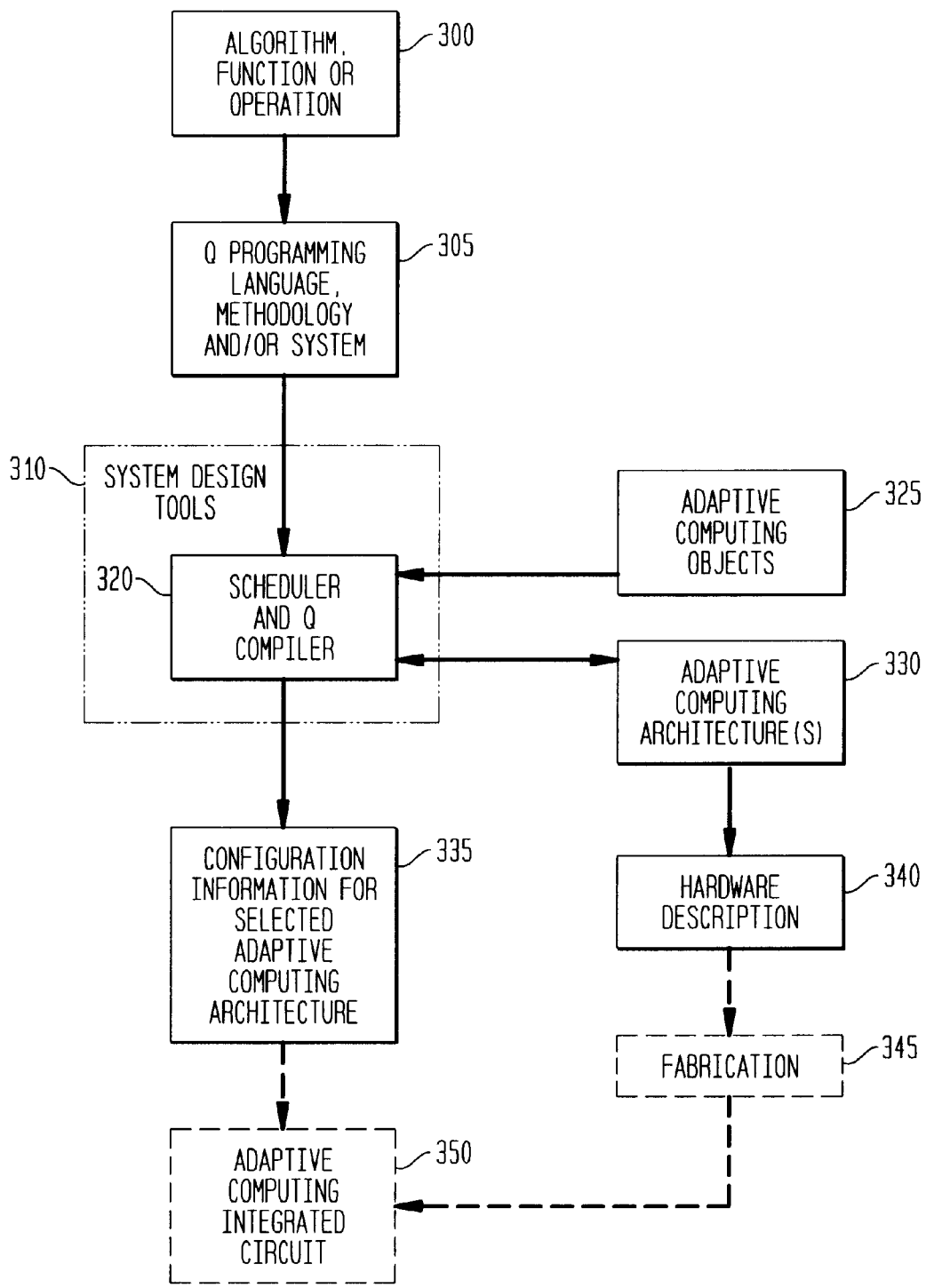
FIG. 3 is a block diagram depicting the role of Q language in programming instructions for configuring computational units, in accordance with the present invention.

FIG. 3 is a block diagram depicting the role of Q language in providing for configuration of computational units, in accordance with the present invention. FIG. 3 depicts the progress of an algorithm (function or operation) 300, coded in the high-level Q language 305, through a plurality of system design tools 310, such as a scheduler and Q compiler 320, to its final inclusion as part of an adaptive computing IC (ACE) configuration bit file 335, which contains the configuration information for adaptation of an adaptive computing circuit, such as the ACE 100. The system design tools 310, which include a hardware object "creator", a computing operations "scheduler" and an operation "emulator" are the subject of other patent applications. Relevant to the present invention are the scheduler and Q compiler 320 component. Components of an adaptive computing circuit are initially defined as hardware "objects", and in this instance, specifically as adaptive computing objects 325. Once the algorithm, function or operation (300) has been expressed in the Q language (305), the scheduler portion of scheduler and Q compiler 320 arranges (or schedules) the programmed operations with or across the adaptive computing objects 325, in a sequence across time and across space, in an iterative manner, producing one or more versions of adaptive computing architectures 330, and eventually selecting an adaptive computing architecture as optimal, in light of various design goals, such as speed of operation and comparatively low power consumption.

When the programmed operations have been scheduled across the selected adaptive computing architecture, the Q compiler portion of scheduler and Q compiler 320 then converts the scheduled Q program into a bit-level information stream (configuration information) 335. (It should be noted that, as used throughout the remainder of this discussion, any reference to a "compiler" should be understood to mean this Q compiler portion of scheduler and Q compiler 320, or an equivalent compiler). Following conversion of the selected adaptive computing architecture into a hardware description 340 (using any preferred hardware description language such as Verilog or VHDL) and fabrication 345, the resulting adaptive computing integrated circuit 335 may be configured, using the configuration information 335 generated for that adaptive computing architecture.

For example, one of the novel features of the Q language is that it can specify parallel execution of particular functions or operations, rather than being limited to sequential execution. Using defined adaptive computing objects 325, such as ACE computational elements, the scheduler selects computational elements and matches the desired parallel functions to available computational elements, or creates the availability of computational elements, for the function to be executed at a scheduled time, in parallel, across these elements.

Figure 4:
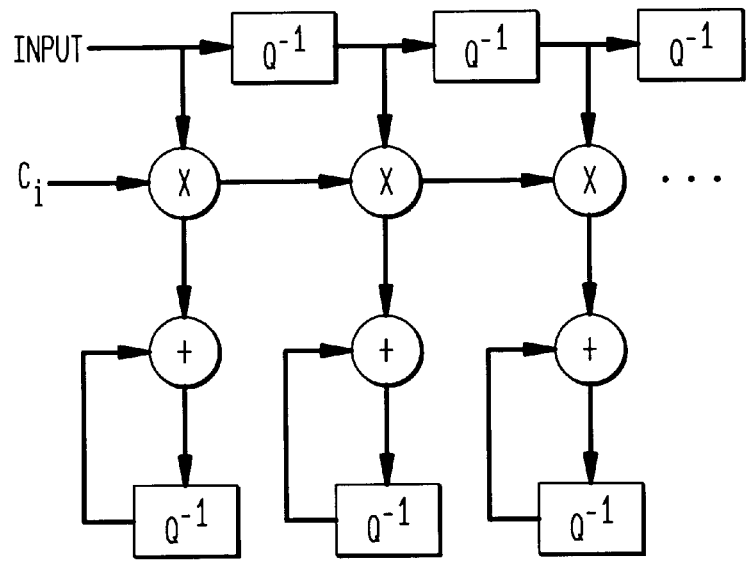
FIG. 4 is a schematic diagram illustrating an exemplary data flow graph, utilized in accordance with the present invention.

FIG. 4 is a schematic diagram illustrating an exemplary data flow graph, utilized in accordance with the present invention. Algorithms or other functions selected for acceleration are converted into data flow graphs (DFGs), which describe the flow of inputs through computational elements to produce outputs. The data flow graph of FIG. 4 shows various inputs passing through multipliers and then iterating through adders to produce outputs. Equipped with data flow graphs, the high-level Q code may be refined to improve the computing performance of the algorithm.

As illustrated, the data flow graph describes a comparatively fine-grained computation, i.e., a computation composed of relatively simple, primitive operators like add and multiply. As discussed below, data flow graphs may also be used at a higher level of abstractions that describe more coarse-grained computations, such as those composed of complex operators like filters. These operators typically correspond to tasks that may comprise many instances of the more fine-grained data flow graphs.

For example, a digital signal processing ("DSP") system involves a plurality of operations that can be depicted by data flow graphs. Q supports the construction of DSP systems by utilizing computational "blocks" consisting of a plurality of programmed DFGs that communicate with each other via data "streams". Data are passed from one block to another by connecting the output streams of blocks to the input streams of other blocks. A DSP system operates efficiently by running the individual blocks when input data are available, which then produces output data used by other blocks. Blocks may be executed concurrently, as determined by a Q scheduler. (It should be noted that this Q scheduler is different than the system tool scheduler (of 320) discussed above, which schedules the compiled Q code to available computational elements, in space and time).

At its simplest, a block implements a computation that consumes some number of inputs and processes them to produce some number of outputs. A block in the Q language is an object, that is, an instance of a class. It can be loaded into a matrix, it has persistent data, such as stream variables and coefficients, state, and methods such as init ( ) and run ( ). As exemplary methods, invoking the init ( ) method initializes connections and performs any other system specific initialization, while the run ( ) method, which has no parameters, executes the block.

As an example, a finite impulse response filter ("FIR"), commonly used in digital signal processing, could be implemented as a Q block. The filter coefficients, the input and output streams and a variable used for the input state are part of the filter state. The run ( ) method processes some number of inputs from an input stream, computes, and writes the outputs to an output stream. The run ( ) method could be called many times for successive streams of input data, with the state of the execution saved between invocations.

Treating a matrix computation as an object allows it to be run in short bursts instead of all at once. Because its state is persistent, execution of a computation object can be stopped and continued at a later time. This is vital for real-time DSP applications where data become available incrementally. In the example FIR filter, the filter can be initialized, and run on input data as it becomes available without any overhead to reinitialize or load data into the matrix. This also allows many matrix computations to concurrently share the hardware because each maintains its own data.

The efficiency of a block's execution as measured in power usage and clock cycles depends upon how well the compiler can optimize the programming code to produce a configuration bit file that directs parallel execution of operations while minimizing memory accesses. Q contains constructs that allow the programmer to expose the parallelism of the computation to the compiler in a block, and to compose a digital signal processing system as a collection of blocks, supporting both types of data flow mentioned above.

The overall goal of the Q language is to support systems that are implemented partly in hardware using either the adaptive computing architecture or parameterized hardwired components, and which may also be implemented partly in software on a conventional processor. Q primarily supports the construction of DSP systems via the composition of computational blocks that communicate via data streams. These blocks are compiled to run either on the host processor or in the adaptive computing architecture. This flexibility of implementation supports code reuse and flexible system implementation as well as rapid system prototyping using a software only solution. When a block is compiled to the adaptive computing architecture, the compiler attempts to produce an efficient parallel version that minimizes memory accesses. How well the compiler can do this generally depends on how the block is written: as mentioned above, Q contains constructs that allow the programmer to expose the parallelism of the computation to the compiler.

The blocks of the present invention follow a reactive dataflow model, removing data from input streams and processing it to produce data on output streams. Data is passed from one block to another by connecting the output streams of blocks to the input streams of other blocks. The entire system operates by running the individual blocks when their input data are available, which then produces output data used by other blocks. The scheduling of blocks can either be done statically at compile time in the case of well-behaved data flow systems such as synchronous data flow, or dynamically in the more general case. The scheduler can be supplied either by the system software, which uses information supplied by the blocks about its I/O characteristics, or it can be left to the user program. In order for a system to be scheduled automatically, the blocks should publish their I/O characteristics.

A stream carrying data between two blocks is implemented as a channel, which contains a buffer to store data items in transit between the blocks as well as information about the size of the buffer and the number of items in it. Blocks producing data use an output stream to send data through a channel to the input stream of another block. When a block writes data to an output stream, the data is stored in the channel where it becomes available to the input stream. When a block reads data from an input stream, it is removed from the channel. Thus the channel implements the FIFO implicit in dataflow graph arcs. The channel buffer is typically implemented using shared buffers so that no data copying is necessary: the writing block writes data directly into the buffer and the reading block reads it directly from the buffer.

Streams are declared to carry a specific data type which may be a built-in type or user-defined such as a class object or an array. Reads and writes are done on items of the data type and the channel buffer is sized in terms of how many data items it contains. A stream data item may be as simple as a number or as complex as an array of data. Reading an input stream normally consumes a data item and writing an output stream produces a data item to the stream. However, for complex data items where the item may be processed incrementally, an open can be done to get a handle to the next item of the stream without consuming or producing it. After the item has been processed, a close is used to complete the read or write. More complex operations may also be supported, such as reading ahead or behind the current location in the stream. However, such operations make assumptions about the streams that are difficult for a scheduler to check.

In order for the scheduler to be able to construct a schedule, a block should publish its I/O characteristics and its computation timing. This information can be used by a scheduler at compile time to construct a static schedule, or at run time for dynamic scheduling. Such information can be used as preconditions that must be met before a block is executed. For example, the precondition might be that there are eight data items available on the input stream and space for eight data items on the output stream.

Streams may be declared to be non-blocking (the default) or blocking. Non-blocking is the default for dataflow systems where scheduling is done to ensure that no blocking can occur. In this case reading an empty stream or writing a full stream is an error. Blocking only makes sense where blocks can run in parallel or where block execution can be suspended to allow other blocks to supply the needed data. Blocking is implemented in hardware for hardware blocks. Note that streaming I/O can be used to implement double-buffering, either blocking or non-blocking. In this case, the channel buffer contains space for two items (which can be arrays) where the output stream can be writing one array while the input stream reads the other.

The stream buffer sizes depend on the relative rates at which blocks produce and consume data. Normally dataflow blocks are written in terms of the computation corresponding to one time step, sample or frame. For example, a filter would consume the next input sample, producing the corresponding output sample. Implementing a system at such a fine-grained level might be very inefficient, however. The programmer may decide for efficiency reasons that every invocation of a block will compute many data samples; however, larger buffers are needed to store the increased amount of I/O data.

An application will generally comprise both signal processing components constructed as data flow graphs as described above, as well as control-oriented "supervisor code" that interacts with other applications and the operating system, and controls the overall processing required by the application. This control-oriented part of the application would be written in the usual procedural style, as known in the art. This supervisor code may execute the nodes of a dataflow graph directly, particularly when the computation produces information that changes how the computation is performed.

The key concepts, mechanisms, constructs and syntax of the Q language are described in detail below.
1. Dataflow Statements in the Q Language Q computation objects describe computations that use the adaptive computing architecture to apply operations to input data to produce output data. The set of operations are depicted in data flow graphs and are accomplished in programming code by a plurality of assignment statements. Although some operations may be executed in parallel, the execution semantics are defined by the sequential ordering of assignments as they appear in a program. A compiler may perform analysis to find parallelism, or may not detect opportunities for parallelism that may be obvious to an experienced programmer. As a consequence, in accordance with the present invention, the Q "dataflow" statement informs the compiler that the code within braces following the dataflow statement describes a computation corresponding to a static, acyclic data flow graph that can be executed in parallel. Other than conditional branching performed using the known method of predicated execution (which moves branches into a data flow graph), there is no branching in the dataflow section, and no non-obvious side effects or aliasing that would cause data dependencies a compiler cannot detect. If the data flow graph is invoked as a loop body, the scheduler may schedule the data flow graphs of adjacent iterations so that they overlap and thus achieve even greater parallelism. For a comparatively straightforward example:

```
int sumY1;
int sumY2;
int sumXY1;
int sumXY2;
dataflow {
    sumY2 = sumY2 + sumY1;
    sumXY2 = sumXY2 + sumXY1;
}
```

The example above shows four variables of data type (or datatype) integer, two of which are assigned new values within a dataflow section. Because the values of sum Y2 and sum XY2 are independent, the dataflow statement directs that the two operations be done in parallel. (While useful for explanatory purposes, this example is relatively trivial, as a compiler may recognize such an easy example; in actual practice, the dataflow statement is especially useful for directing a compiler or scheduler in how to divide large data flow graphs into units which may be scheduled in parallel).
2. Channels and Blocks in the Q Language Q blocks are connected together using Q "channels", each channel an object with a buffer in memory for data, an input stream and an output stream. Channels are conceptually related to "named pipes" in the Unix operating system environment, but unlike named pipes, when channel data are accessed they need not be copied from the buffer to another location.

In the method of the present invention, a channel is allocated to a first block to use for output stream, then the channel is subsequently defined as input stream to a second block, to connect the two blocks. A channel is declared with the type of data communicated through the channel and the size of the buffer. The following code fragment illustrates how two blocks are connected using a channel:

```
// Channel with buffer for 16 items of datatype fraction
channel<fract16> chan(16);
// Connect blockA output to channel
blockA.init(streamOut<fract16>(chan));
// Connect blockB input to channel
blockB.init(streamIn<fract16>(chan));
// Are there more than 4 items // in the buffer ?
if (chan.items( ) > 4)
    blockB.run( );
```

The channel also has a method that allows supervisor code to find out the size of the buffer and how full it is.

3. Stream Variables

Blocks access channels via streams. A "stream" variable supports the streaming I/O abstraction where by each "read" of the input stream variable retrieves the next available value of the stream and each "write" to an output stream sends a value to the stream. A stream variable references a channel buffer and is implemented using an index that is automatically incremented whenever it is read or written. This automatic array indexing is accomplished by using an address generator in the adaptive computing architecture or other hardware.

```
// Declare an input stream variable and an
// output stream variable with a buffer of N items of
// datatype fraction.
streamIn <fract16> svar(N);
streamOut <fract16> svar(N);
// Reference an input stream:
// returns current value, advances stream.
var = svar.read( );
// Write to output stream:
// sends next value, advances stream.
svar.write(var);
// Open a stream data item for read/write without advancing
// stream
var = svar.open( );
// Close an open stream data item: advances the stream
svar.close( );
// Debug method: print the stream buffer,
// showing current location
svar.display( );
```

Figure 5:
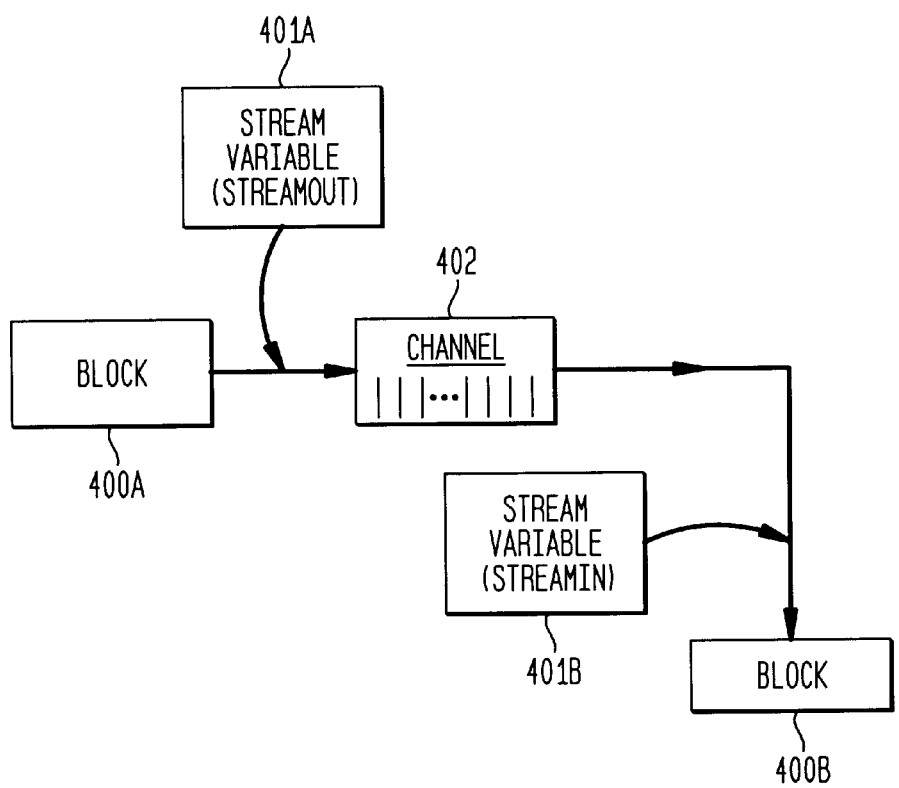
FIG. 5 is a block diagram illustrating the communication between Q language programming blocks, in accordance with the present invention.

The relationships between blocks, channels and streams are illustrated in FIG. 5. Block $400_A$ uses a stream variable $401_A$ to write to channel 402. Channel 402 stores the data until the scheduler determines that enough data have accumulated to justify a read by block $400_B$, which uses a stream variable $401_B$ as input.

As described above, channels have methods that allow supervisor code to learn the size of the channel's buffer, and how full it is. The scheduler can then optimize I/O operations of the streams from/to the various blocks. Furthermore, because channel variables can be shared among blocks, multiple blocks can access channel data simultaneously, increasing parallel execution. The stream variable and a sample Q programs are discussed in greater detail below.

A stream variable supports the streaming I/O abstraction where by each read of the input stream variable retrieves the next available value of the stream and each write to an output stream sends a value to the stream. A stream variable references a channel buffer and is implemented using an index that is automatically incremented whenever it is read or written. This automatic array indexing is implemented directly using an address generator. The following example program snippet computes a FIR filter using stream and state variables. Each loop iteration reads a sample from the input stream, computes the resulting output, and writes it to the output stream. The sample state variable is used keep a history of the values assigned to sample. Note that sample [1] refers to the current value of the sample state variable because of the assignment to sample before the unroll statement (discussed in greater detail below).

```
streamIn<fract16> input;      // Input stream of samples
streamOut<fract16> output; // Output stream for results
loop (int l=0; l<nOut; l++) dataflow {
    // Read the next sample from input stream
    sample = input.read( );
    sum = 0.0;
    unroll (int i=0; i<nCoef; i++) {
        sum = sum + coefReg[i] * sample[nCoef-i];
    }
    output.write(sum);      // Write result to output stream
}
```

A stream variable is usually initialized by the init( ) method to reference a channel provided by the calling procedure. Note that channels are implemented using a circular buffer, that is, the stream index wraps around to the beginning of the channel buffer when it reaches the end.

The read and write stream methods read and write individual data items in streams. For more complicated stream processing, the open method can be used to get a pointer to the next item in the stream. This pointer can then be used, for example, to access data items that are complex data types or arrays. The close method is then used to complete the open, which moves the stream index to the next data item in the stream. The open and close methods can also be used with output streams. By default, the stream is advanced by one data item by each read, write or close. In cases where the stream data is treated as an array, the stream must be informed via the init( ) method how many data items to advance. It is important that when using open( ) to process blocks of data that the channel buffer is sized in units of the block size. In other words, it is important that the block of data processed by an open( ) does not go past the end of the buffer for obvious reasons. Thus, if a stream contains image data which is processed via an open( ) in blocks of 8 rows (as in the example below) then the channel buffer must be sized in units of 8 row blocks.

Sometimes data needs to be accessed in more complex ways than simple streams allow. The following complicated example uses a combination of streams and iterators (discussed below) to process an image.

```
streamIn<fract14> inputStr;
// The inSwath array is one swath from the input stream
fract14 * inSwath;
// We will access the input swath using the 3D iterator below:
// foreach (window in the row of windows)
//   foreach (row in the window)
//     foreach (pixel in the row)
Qiterator<fract14> inSwathI; // 3D iterator
// Output access pattern is the same as for the input image
streamOut<fract14> outputStr; // Output stream for result swaths
// The outSwath array is one swath written to the output stream
fract14 *outSwath;
// We will access the output swath using the 3D iterator below:
// foreach (window in the row of windows)
```

-continued

```
//  foreach (colum in the window)
//     foreach (pixel in the column)
Qiterator<fract14> outSwathI; // 3D iterator
-------------------
inputStr.init(8*imageWidth); // init( ) initializes the stream
outputStr.init(8*imageWidth);
-------------------
fract14 dataIn[8];
fract14 dataOut[8];
// Get next swath from input stream and initialize iterator
inSwath = inputStr.open( );
// Treat the input swath as a 3D array [row, window, col]
inSwathI.init(inSwath,
          1, 0, 1, 8,              // rows in window
          2, 0, 1, imageWidth/8,   // windows on row
          0, 0, 1, 8);             // columns in window
// Get access to next swath in output stream
outSwath = outputStr.open( );
// Treat the output swath as a 3D array [row, window, col]
outSwathI.init(outSwath,
          0, 0, 1, 8,              // rows in window
          2, 0, 1, imageWidth/8,   // windows on row
          1, 0, 1, 8);             // columns in window
// Loop over all windows in a row of the image
loop (int w=0; w<imageWidth/8; w++) {
    loop (int row=0; row<8; row++) dataflow {
        unroll (i=0; i<8; i++) {
            dataIn[i] = inSwathI.next( );
        }
        // The row DCTs are done here . . .
    }
    loop (int col=0; col<8; col++) dataflow {
    }
    // The column DCTs are done here . . .
    // Write the results to the output array
    unroll (i=0; i<8; i++) {
        outSwathI.next( ) = dataOut[i];
    }
  }
}
inputStr.close( );   // We are done with the input and output
outputStr.close( );
```

All that is shown here are the details of accessing the input and output images—the computation has been omitted for clarity. It should also be noted that the particular syntax used was designed for backward compatibility with C++ as a prototype implementation; a myriad of other syntaxes are available and may even be clearer, and are within the scope of the present invention. For example, the Q code:

```
inSwathI.init(inSwath,
          1, 0, 1, 8,              // rows in window
          2, 0, 1, imageWidth/8,   // windows on row
          0, 0, 1, 8);             // columns in window
``` may be equivalently replaced with:

```
inSwathI = {|
    for( int i = 0; i < imageWidth/8; i++ )
        for( int j = 0; j < 8; j++ )
            for( int k = 0; k < 8; k++ )
                inSwath[j] [i*8+k]
|}
```

The block processes all the 8×8 windows on an 8-row swath, producing a corresponding swath in the output image. Pixels in the input image are accessed in row major order within each 8×8 window, while pixels in the output image are written in column major order. Clearly, the pixels cannot be accessed in stream order, so an open( ) is used to access an entire swath. The stream init( ) method is used to indicate how many pixels are read and written by each open( )/close( ) pair for the input and output images. The pointer returned by the open( ) is handed to the iterator, which also indicates how the iteration is done. In this case, a 3-dimensional iterator is used to define the windowed data structure on the image swath. Note that the iterator must be reinitialized for each new swath. Also note that we write the program to process single windows because the window data is not contiguous in the stream, while swaths are.

In some cases, processing may require the program to read ahead on a stream, and then back up and read some of the data again. The rewind( ) method is provided to allow a program to back up a stream. The argument to rewind indicates how many data items to back up. If the argument is negative, the stream is moved forward. Caution must be used with rewind because if blocks are running in parallel, then the producing block may have already written into the buffer space vacated by the reads, leaving no space for the rewind( ).

4. State Variables

Q language "state" variables allow convenient access to previous values of a variable in a computation occurring over time. For example, a FIR filter may refer to the previous N values of the input variable. State variables avoid having to keep track of the history of a variable explicitly, thus streamlining programming code. State variables are declared as follows:

state<type>name($N$);

where "type" is the data type and "name" is the name of the state variable, and "N" is a constant which declares how far into the past a variable value can be referenced. Arrays of state variables are allowed, for example:

state<fract16>$X$[8](2);

which declares an array of 8 state variables of data type fraction, each of which keeps two history values.

The value of a state variable i time units in the past (i.e. time=t−i) is referenced using the [] operator:

sum=sum 30 in[$i$];

refers to the value of in, i time steps in the past.

A state variable is assigned using a normal assignment statement to the state variable without the time operator []. For example the assignment:

state<fract16>$S$(4);

$S=X;$ assigns a new value X to S. Each assignment to a state variable causes time to advance for that state variable. Time is defined for a state variable by the assignments made to it. When a state variable is assigned a value, time advances and the value becomes the previous value of the variable, i.e. S[1]. After the statement S=X; above, the value of S[1] is X, the previous value of S[1] becomes available as S[2], the previous value of S[2] is available as S[3], etc. State variables can be initialized by specifying their values for specific times in the past. This is done by assigning a value to X[i] to initialize the value of X at t−i. Assignments to a state variable using the [] notation do not advance time.

5. Unroll Statement

"Unroll" statements in the Q language, in general, are utilized to provide for parallel execution of computations and other functions, which may otherwise be problematic due to the sequential nature of typical "loop" statements of the prior art. More specifically, the "unroll" statement provides for control over how a compiler handles a loop: on the one hand, it can be used to direct the compiler (320) to unroll the code before scheduling it; on the other hand, where a compiler might aggressively unroll a loop, the unroll statement of the invention may constrain precisely how it should be unrolled. "Unroll" statements in the Q language utilize the syntax and semantics utilized in C for loops, but are compiled very differently, with very different results. An unroll in the Q language is converted at compile time into straight-line code, each command of which implicitly could be executed in parallel. Unroll parameters must be known at compile time and any reference to the iteration variable in the unroll body evaluates to a constant.

For example, the code fragment below assigns the value of the index of an array to the indexed element of the array:

```
int16 j;
int16 a[4];
unroll (j=0; j<4; j++) {
    a[j] = j;
}
``` is equivalent to the code int16 a[4];
a[0]=0;
a[1]=1;
a[2]=2;
a[3]=3;

Unroll statements are allowed in dataflow blocks, because the entire unroll statement can in principle be executed in a single cycle if the data dependencies allow it. It should be noted that loop and unroll are quite different; although both run a fixed number of iterations, loop's are executed a number of iterations determined at run time, while unroll statements are elaborated into a dataflow graph at compile time. This means that loops cannot be part of a dataflow block because it is not known until runtime how many iterations a loop will execute (i.e., the different iterations of a loop statement must be executed sequentially, in contrast to the parallel execution of an unroll statement).

In the following example, Q program code of the present invention computes a FIR filter using stream and state variables, and the unroll command. Each iteration reads a sample from the input stream, computes, and writes the result to the output stream. The sample state variable is used keep a history of the values assigned to sample.

```
streamIn<fract16> input;      // Input stream of samples
streamOut<fract16> output;    // Output stream for results
loop (int l=0; l<nOut; l++) dataflow {
    sample = input.read( );   // Perform parallel reads
                              // from the input stream
    sum = 0.0;
    unroll (int i=0; i<nCoef; i++) {
        sum = sum + coefReg[i] * sample[nCoef-i];
    }
    output.write(sum);        // Write result to output stream
}
```

6. Iterators

Data for Q programs is input and output via matrices of the adaptive computing architecture adapted for memory functionality (or random access memories (RAMs) that are shared with the host processor). For purposes of the present invention, the only concern is that values in a memory are transferred to some form of register, and then transferred back. Data are often stored in the form of arrays that are addressed using some addressing pattern, for example, linear order for a one-dimensional array or row-major order for a two-dimensional array. Q "Iterators" are special indexing variables used to access arrays in a fixed address pattern, and make efficient use of any available address generators. For example, a two-dimensional array can be accessed in row-major order using an iterator instead of the usual control structure that uses nested "for" loops.

```
ram fract16 X[ ];      // Two dimensional array in RAM
iterator Xi (X, 0, 0, 1, 128,
             1, 0, 1, 64);
sum = sum + Xi;        // Retrieve the next value in the array
```

In the preferred embodiment, the argument list for an iterator declaration contains first the array to be accessed, and then groups of four parameters for each dimension over which the array is to be iterated:

(1) level—referring to the iteration level, in which the 0 level is the innermost loop and iterates the fastest;

(2) init—referring to the initial value of the index;

(3) inc—referring to the amount added to the index in each iteration; and (4) limit—referring to the index limit for this index.

It should be noted, however, that as mentioned above, the particular syntax employed may be highly variable, and many equivalent syntaxes are within the scope of the present invention.

Each time the iterator is referenced, the next value in the array is accessed according to the iterator pattern. In the above example, Xi is an iterator used to reference X as a 128×64 two-dimensional array. The address pattern generated is equivalent to that generated by the following nested "for" loops:

```
for (j=0; j<64; j=j+1)
    for (i=0; i<128; i=i+1)
        X [i] [j]
```

It should be noted that the inner "for" statement iterates over the first dimension because level=0 for the first dimension. Although the compiler can often implement array indexing with an address generator, iterators expose the deterministic address pattern directly to the compiler for situations that are too complex. This action reduces the work, i.e., clock cycles, expended to reference an array.

7. Loop Statement

The Q "loop" statement is defined to have the same syntax utilized in the C "for" statement. However, Q loops are restricted to execute a fixed number of times, determined at run time. More precisely, in the statement:

```
loop (int i=0; i<n; i=i+c) {
    s = s + dataI;
}
``` the iteration variable i and the loop limit n and increment value c cannot be modified in the loop body. Moreover, in the preferred embodiment, there is no mechanism to break out of the loop before the predetermined number of iterations have executed. Without a means to branch from a loop statement, computing overhead, and thus processing time, is reduced. Other efficient control mechanisms, however, may be implemented in the adaptive computing architecture.

FIGS. 6A, 6B and 6C are diagrams providing a useful summary of the Q programming language of the present invention. FIGS. 7 through 9 provide exemplary Q programs. In particular, FIG. 7 provides a FIR filter, expressed in the Q language for implementation in adaptive computing architecture, in accordance with the present invention; FIG. 8 provides a FIR filter with registered coefficients, expressed in the Q language for implementation in adaptive computing architecture, in accordance with the present invention; and FIGS. 9A and 9B provide a FIR filter for a comparatively large number of coefficients, expressed in the Q language for implementation in adaptive computing architecture, in accordance with the present invention.

The method and system embodiments of the present invention are readily apparent. For example, the preferred method for programming an adaptive computing integrated circuit includes:

(1) using a first program construct to provide for execution of a computational block in parallel, the first program construct defined as a dataflow command for informing a compiler that included commands are for concurrent performance in parallel;

(2) using a second program construct to provide for automatic indexing of reference to a channel object, the channel object for providing a buffer for storing data, the second program construct defined as a stream variable for referencing the channel object;

(3) using a third program construct for maintaining a previous value of a variable between process invocations, the third program construct defined as a state variable for maintaining a plurality of previous values of a variable after the variable has been assigned a plurality of current values (for example, maintaining the "N" most recent values assigned to the variable);

(4) using a fourth program construct to provide for iterations having a predetermined number of iterations at a compile time, the fourth program construct defined as an unroll command for transforming a loop operation into a predetermined plurality of individual executable operations;

(5) using a fifth program construct to provide array accessing, the fifth program construct defined as an iterator variable for accessing the array in a predetermined, fixed address pattern; and (6) using a sixth program construct to provide for a fixed number of loop iterations at run time, the sixth program construct defined as a loop command for informing a compiler that the included commands contain no branching to locations outside of the loop and that a plurality of loop conditions cannot be changed.

Also for example, the first program construct may be viewed as having a semantics including a first program construct identifier, such as the "dataflow" identifier; a commencement designation and a termination designation following the first program construct identifier, such as "{" and "}", respectively, or another equivalent demarcation; and a plurality of included program statements contained within the commencement designation and the termination designation.

The system of the present invention, while not separately illustrated, may be embodied, for example, in a computer, a workstation, or any other form of computing device, whether have processor-based architecture, an ASIC-based architecture, an FPGA-based architecture, or an adaptively-based architecture. The system may further include compilers and schedulers, as discussed above.

Numerous advantages of the present invention are readily apparent. The present invention provides for a comparatively high-level programming language, for enabling ready programmability of adaptive computing architectures, such as the ACE architecture. The Q programming language is designed to be backward compatible with and syntactically similar to widely used and well known languages like C++, for acceptance within the engineering and computing fields. More importantly, the method, system, and Q language of the present invention provides new and specialized program constructs for an adaptive computing environment and for maximizing the performance of an ACE integrated circuit or other adaptive computing architecture.

The language, system and methodology of the present invention, include program constructs that permit a programmer to define data flow graphs in software, to provide for operations to be executed in parallel, and to reference variable states in a straightforward manner. The invention also includes mechanisms for efficiently referencing array variables, and enables the programmer to succinctly describe the direct data flow among matrices, nodes, and other configurations of computational elements and computational units. Each of these new features of the invention provide for effective programming in a reconfigurable computing environment, facilitating a compiler to implement the programmed algorithms efficiently in adaptive hardware.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method for programming an adaptive computing integrated circuit for a plurality of functions, the adaptive computing integrated circuit having a plurality of heterogeneous computational elements, the plurality of heterogeneous computational elements capable of being configured and reconfigured for performance of the plurality of functions, the method comprising:

(a) using a first program construct of a plurality of program constructs to provide for execution of a computational block in parallel by a subset of heterogeneous computational elements of the plurality of heterogeneous computational elements, wherein the first program construct is capable of being compiled, mapped and scheduled to select, and to provide configuration information to configure, the subset of heterogeneous computational elements for parallel execution of the computational block;

(b) using a second program construct of the plurality of program constructs to provide for automatic indexing of reference to a buffer object;

(c) using a third program construct of the plurality of program constructs for maintaining a previous value of a variable between process invocations;

(d) using a fourth program construct of the plurality of program constructs to provide for iterations having a predetermined number of iterations at a compile time;

(e) using a fifth program construct to provide for data flow among the plurality of heterogeneous computational elements by defining a channel object having an output data stream from a data producing computational block and an input data stream to a data consuming computational block;

(f) using a sixth program construct of the plurality of program constructs to provide array accessing with a predetermined address pattern; and wherein the plurality of program constructs are capable of being compiled, mapped and scheduled to select one or more heterogeneous computational elements for performance of the plurality of functions, and further to provide configuration information to determine a plurality of configurations and reconfigurations of the plurality of heterogeneous computational elements for performance of the plurality of functions.

2. The method of claim 1, wherein step (a) further comprises:
using a dataflow command for informing a compiler that included commands are for concurrent performance in parallel.

3. The method of claim 1, wherein steps (b) and (e) further comprise:
using the channel object for providing a buffer for storing data; and
using a stream variable for referencing the channel object.

4. The method of claim 3, wherein the channel object is a buffer instantiated with a declared data type and a size, and wherein the stream variable is declared with a buffer of a plurality of data items of a specified data type.

5. The method of claim 1, wherein step (c) further comprises:
using a state variable for maintaining a plurality of previous values of a variable after the variable has been assigned a plurality of current values.

6. The method of claim 1, wherein step (d) further comprises:
using an unroll command for transforming a loop operation into a predetermined plurality of individual executable operations.

7. The method of claim 1, wherein step (f) further comprises:
using an iterator variable for accessing the array in a predetermined, fixed address pattern.

8. The method of claim 1, wherein the sixth program construct is a declaration which includes a plurality of arguments, the plurality of arguments including an iteration level, an initial value of an index, an increment added to the index for a repeated iteration, and an index limit.

9. The method of claim 1, further comprising:
(g) using a seventh program construct of the plurality of program constructs to provide for a fixed number of loop iterations at run time.

10. The method of claim 9, wherein step (g) further comprises:
using a loop command for informing a compiler that a plurality of included commands contain no branching to locations outside of the loop and that a plurality of loop conditions are fixed.

11. The method of claim 1, wherein the first program construct has a semantics comprising:
a first program construct identifier, followed by a plurality of included program statements.

12. The method of claim 11, wherein the first program construct has a syntax comprising:
a dataflow designation;
a commencement designation and a termination designation following the dataflow designation; and
the plurality of included program statements contained within the commencement designation and the termination designation.

13. The method of claim 1, wherein the fourth program construct has a semantics comprising:
a fourth program construct identifier having a plurality of arguments, followed by program statements for expansion into a plurality of individual commands according to the plurality of arguments.

14. A system for programming an adaptive computing integrated circuit for a plurality of functions, the adaptive computing integrated circuit having a plurality of heterogeneous computational elements, the plurality of heterogeneous computational elements capable of being configured and reconfigured for performance of the plurality of functions, the system comprising:
means for using a first program construct of a plurality of program constructs to provide for execution of a computational block in parallel by a subset of heterogeneous computational elements of the plurality of heterogeneous computational elements, wherein the first program construct is capable of being compiled, mapped and scheduled to select, and to provide configuration information to configure, the subset of heterogeneous computational elements for parallel execution of the computational block;
means for using a second program construct of the plurality of program constructs to provide for automatic indexing of reference to a buffer object;
means for using a third program construct of the plurality of program constructs for maintaining a previous value of a variable between process invocations;
means for using a fourth program construct of the plurality of program constructs to provide for iterations having a predetermined number of iterations at a compile time;
means for using a fifth program construct to provide for data flow among the plurality of heterogeneous computational elements by defining a channel object having an output data stream from a data producing computational block and an input data stream to a data consuming computational block;
means for using a sixth program construct of the plurality of program constructs to provide array accessing with a predetermined address pattern; and
wherein the plurality of program constructs are capable of being compiled, mapped and scheduled to select one or more heterogeneous computational elements for performance of the plurality of functions, and further to provide configuration information to determine a plurality of configurations and reconfigurations of the plurality of heterogeneous computational elements for performance of the plurality of functions.

15. The system of claim 14, wherein the means for using the first program construct further comprises:
means for using a dataflow command for informing a compiler that included commands are for concurrent performance in parallel.

16. The system of claim 14, wherein the means for using the second program construct and the means for using a fifth program construct further comprise:
means for using the channel object for providing a buffer for storing data; and
means for using a stream variable for referencing the channel object.

17. The system of claim 16, wherein the channel object is a buffer instantiated with a declared data type and a size, and wherein the stream variable is declared with a buffer of a plurality of data items of a specified data type.

18. The system of claim 14, wherein the means for using the third program construct further comprises:
means for using a state variable for maintaining a plurality of previous values of a variable after the variable has been assigned a plurality of current values.

19. The system of claim 14, wherein the means for using the fourth program construct further comprises:

means for using an unroll command for transforming a loop operation into a predetermined plurality of individual executable operations.

20. The system of claim 14, wherein the means for using the sixth program construct further comprises:

means for using an iterator variable for accessing the array in a predetermined, fixed address pattern.

21. The system of claim 14, wherein the sixth program construct is a declaration which includes a plurality of arguments, the plurality of arguments including an iteration level, an initial value of an index, an increment added to the index for a repeated iteration, and an index limit.

22. The system of claim 14, further comprising:

means for using a seventh program construct to provide for a fixed number of loop iterations at run time.

23. The system of claim 22, wherein the means for using the seventh program construct further comprises:

means for using a loop command for informing a compiler that a plurality of included commands contain no branching to locations outside of the loop and that a plurality of loop conditions are fixed.

24. The system of claim 14, wherein the first program construct has a semantics comprising:

a first program construct identifier, followed by a plurality of included program statements.

25. The system of claim 24, wherein the first program construct has a syntax comprising:

a dataflow designation;

a commencement designation and a termination designation following the dataflow designation; and the plurality of included program statements contained within the commencement designation and the termination designation.

26. The system of claim 14, wherein the fourth program construct has a semantics comprising:

a fourth program construct identifier having a plurality of arguments, followed by program statements for expansion into a plurality of individual commands according to the plurality of arguments.

27. A tangible medium storing computer readable software for programming an adaptive computing integrated circuit for a plurality of functions, the adaptive computing integrated circuit having a plurality of heterogeneous computational elements, the plurality of heterogeneous computational elements capable of being configured and reconfigured for performance of the plurality of functions, the tangible medium storing computer readable software comprising:

a first program construct of a plurality of program constructs to provide for execution of a computational block in parallel by a subset of heterogeneous computational elements of the plurality of heterogeneous computational elements, wherein the first program construct is capable of being compiled, mapped and scheduled to select, and to provide configuration information to configure, the subset of heterogeneous computational elements for parallel execution of the computational block;

a second program construct of the plurality of program constructs to provide for automatic indexing of reference to a buffer object;

a third program construct of the plurality of program constructs for maintaining a previous value of a variable between process invocations;

a fourth program construct of the plurality of program constructs to provide for iterations having a predetermined number of iterations at a compile time;

a fifth program construct to provide for data flow among the plurality of heterogeneous computational elements by using a channel object having an output data stream from a data producing computational block and an input data stream to a data consuming computational block;

a sixth program construct of the plurality of program constructs to provide array accessing with a predetermined address pattern; and wherein the plurality of program constructs are capable of being compiled, mapped and scheduled to select one or more heterogeneous computational elements for performance of the plurality of functions, and further to provide configuration information to determine a plurality of configurations and reconfigurations of the plurality of heterogeneous computational elements for performance of the plurality of functions.

28. The tangible medium storing computer readable software programming language of claim 27, wherein the first program construct further comprises:

a dataflow command for informing a compiler that included commands are for concurrent performance in parallel.

29. The tangible medium storing computer readable software of claim 27, wherein the second program construct and the fifth program construct further comprise:

a channel object for providing a buffer for storing data; and a stream variable for referencing the channel object.

30. The tangible medium storing computer readable software of claim 24, wherein the channel object is a buffer instantiated with a declared data type and a size, and wherein the stream variable is declared with a buffer of a plurality of data items of a specified data type.

31. The tangible medium storing computer readable software of claim 29, wherein the third program construct further comprises:

a state variable for maintaining a plurality of previous values of a variable after the variable has been assigned a plurality of current values.

32. The tangible medium storing computer readable software of claim 24, wherein the fourth program construct further comprises:

an unroll command for transforming a loop operation into a predetermined plurality of individual executable operations.

33. The tangible medium storing computer readable software of claim 27, wherein the sixth program construct further comprises:

an iterator variable for accessing the array in a predetermined, fixed address pattern.

34. The tangible medium storing computer readable software of claim 27, wherein the sixth program construct is a declaration which includes a plurality of arguments, the plurality of arguments including an iteration level, an initial value of an index, an increment added to the index for a repeated iteration, and an index limit.

35. The tangible medium storing computer readable software of claim 27, further comprising:

a seventh program construct of the plurality of program constructs to provide for a fixed number of loop iterations at run time.

36. The tangible medium storing computer readable software of claim 35, wherein the seventh program construct further comprises:

a loop command for informing a compiler that a plurality of included commands contain no branching to locations outside of the loop and that a plurality of loop conditions are fixed.

37. The tangible medium storing computer readable software of claim 27, wherein the first program construct has a semantics comprising:

a first program construct identifier, followed by a plurality of included program statements.

38. The tangible medium storing computer readable software of claim 37, wherein the first program construct has a syntax comprising:

a dataflow designation;

a commencement designation and a termination designation following the dataflow designation; and the plurality of included program statements contained within the commencement designation and the termination designation.

39. The tangible medium storing computer readable software of claim 27, wherein the fourth program construct has a semantics comprising:

a fourth program construct identifier having a plurality of arguments, followed by program statements for expansion into a plurality of individual commands according to the plurality of arguments.

40. A method for programming an adaptive computing integrated circuit for a plurality of functions, the adaptive computing integrated circuit having a plurality of heterogeneous computational elements, the plurality of heterogeneous computational elements capable of being configured and reconfigured for performance of the plurality of functions,, the method comprising:

using a first program construct of a plurality of program constructs to provide for execution of a computational block in parallel by a subset of heterogeneous computational elements of the plurality of heterogeneous computational elements, wherein the first program construct is capable of being compiled, mapped and scheduled to select, and to provide configuration information to configure, the subset of heterogeneous computational elements for parallel execution of the computational block, the first program construct defined as a dataflow command for informing a compiler that included commands are for concurrent performance in parallel;

using a second program construct of the plurality of program constructs to provide for data flow among the plurality of heterogeneous computational elements by using a channel object having an output data stream from a data producing computational block and an input data stream to a data consuming computational block, the second program construct further providing for automatic indexing of reference to the channel object, the channel object for providing a buffer for storing data, the second program construct further defined as a stream variable for referencing the channel object;

using a third program construct of the plurality of program constructs for maintaining a previous value of a variable between process invocations, the third program construct defined as a state variable for maintaining a plurality of previous values of a variable after the variable has been assigned a plurality of current values;

using a fourth program construct of the plurality of program constructs to provide for iterations having a predetermined number of iterations at a compile time, the fourth program construct defined as an unroll command for transforming a loop operation into a predetermined plurality of individual executable operations;

using a fifth program construct of the plurality of program constructs to provide array accessing, the fifth program construct defined as an iterator variable for accessing the array in a predetermined, fixed address pattern;

using a sixth program construct of the plurality of program constructs to provide for a fixed number of loop iterations at run time, the sixth program construct defined as a loop command for informing a compiler that a plurality of included commands contain no branching to locations outside of the loop and that a plurality of loop conditions are fixed; and wherein the plurality of program constructs are capable of being compiled, mapped and scheduled to select one or more heterogeneous computational elements for performance of the plurality of functions, and further to provide configuration information to determine a plurality of configurations and reconfigurations of the plurality of heterogeneous computational elements for performance of the plurality of functions.

41. The method of claim 40, wherein the channel object is a buffer instantiated with a declared data type and a size, and wherein the stream variable is declared with a buffer of a plurality of data items of a specified data type.

42. The method of claim 40, wherein the fifth program construct is a declaration which includes a plurality of arguments, the plurality of arguments including an iteration level, an initial value of an index, an increment added to the index for a repeated iteration, and an index limit.

43. The method of claim 40, wherein the first program construct has a semantics comprising:

a first program construct identifier;

a commencement designation and a termination designation following the first program construct identifier;

and a plurality of included program statements contained within the commencement designation and the termination designation.

44. The method of claim 40, wherein the fourth program construct has a semantics comprising:

a fourth program construct identifier having a plurality of arguments, followed by program statements for expansion into a plurality of individual commands according to the plurality of arguments.

45. A tangible medium storing computer readable software for programming an adaptive computing integrated circuit for a plurality of functions, the adaptive computing integrated circuit having a plurality of heterogeneous computational elements, the plurality of heterogeneous computational elements capable of being configured and reconfigured for performance of the plurality of functions,, the tangible medium storing computer readable software comprising:

a first program construct of a plurality of program constructs to provide for execution of a computational block in parallel by a subset of heterogeneous computational elements of the plurality of heterogeneous computational elements, wherein the first program construct is capable of being compiled, mapped and scheduled to select, and to provide configuration information to configure, the subset of heterogeneous computational elements for parallel execution of the computational block, the first program construct defined as a dataflow command for informing a compiler that included commands are for concurrent performance in parallel;

a second program construct of the plurality of program constructs to provide for data flow among the plurality of heterogeneous computational elements by using a channel object having an output data stream from a data producing computational block and an input data stream to a data consuming computational block, the second program construct further providing for automatic indexing of reference to the channel object, the channel object for providing a buffer for storing data, the second program construct further defined as a stream variable for referencing the channel object, wherein the channel object is a buffer instantiated with a declared data type and a size, and wherein the stream variable is declared with a buffer of a plurality of data items of a specified data type;

a third program construct of the plurality of program constructs for maintaining a previous value of a variable between process invocations, the third program construct defined as a state variable for maintaining a plurality of previous values of a variable after the variable has been assigned a plurality of current values;

a fourth program construct of the plurality of program constructs to provide for iterations having a predetermined number of iterations at a compile time, the fourth program construct defined as an unroll command for transforming a loop operation into a predetermined plurality of individual executable operations;

a fifth program construct of the plurality of program constructs to provide array accessing, the fifth program construct defined as an iterator variable for accessing the array in a predetermined, fixed address pattern;

a sixth program construct of the plurality of program constructs to provide for a fixed number of loop iterations at run time, the sixth program construct defined as a loop command for informing a compiler that a plurality of included commands contain no branching to locations outside of the loop and that a plurality of loop conditions are fixed; and wherein the plurality of program constructs are capable of being compiled, mapped and scheduled to select one or more heterogeneous computational elements for performance of the plurality of functions, and further to provide configuration information to determine a plurality of configurations and reconfigurations of the plurality of heterogeneous computational elements for performance of the plurality of functions.

46. The tangible medium storing computer readable software of claim 45, wherein the fifth program construct is a declaration which includes a plurality of arguments, the plurality of arguments including an iteration level, an initial value of an index, an increment added to the index for a repeated iteration, and an index limit.

47. The tangible medium storing computer readable software of claim 45, wherein the first program construct has a semantics comprising:

a first program construct identifier; a commencement designation and a termination designation following the first program construct identifier; and a plurality of included program statements contained within the commencement designation and the termination designation;

and wherein the fourth program construct has a semantics comprising: a fourth program construct identifier having a plurality of arguments, followed by program statements for expansion into a plurality of individual commands according to the plurality of arguments.

* * * * *